April 19, 1960 A. G. BILLIN 2,933,082
BASAL METABOLISM APPARATUS
Filed Nov. 18, 1955 12 Sheets-Sheet 6
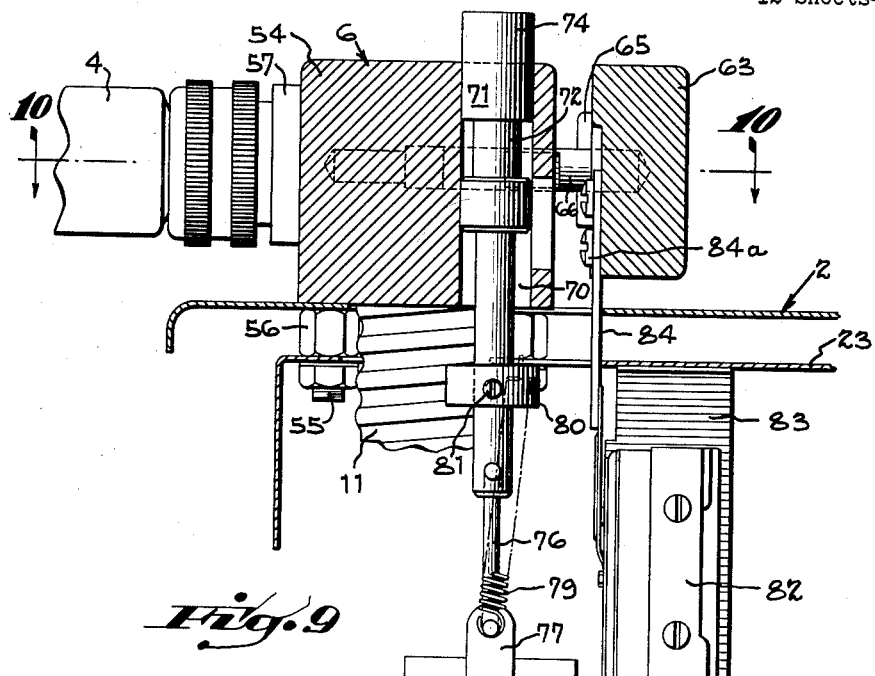
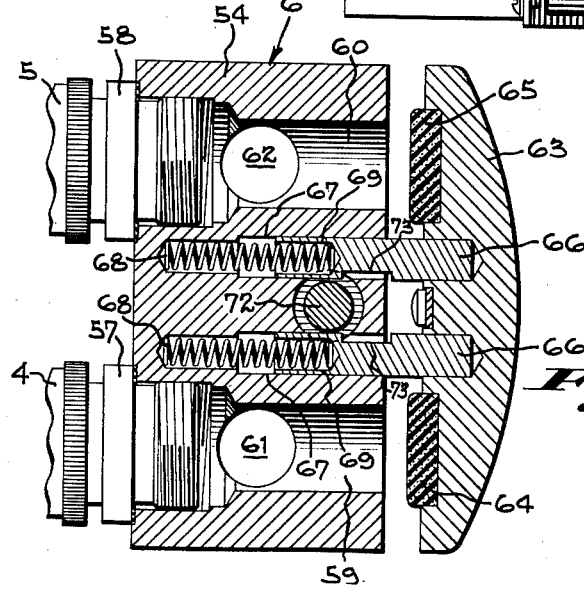
INVENTOR.
Arthur G. Billin.
BY
Wood, Herron & Evans.
ATTORNEYS.

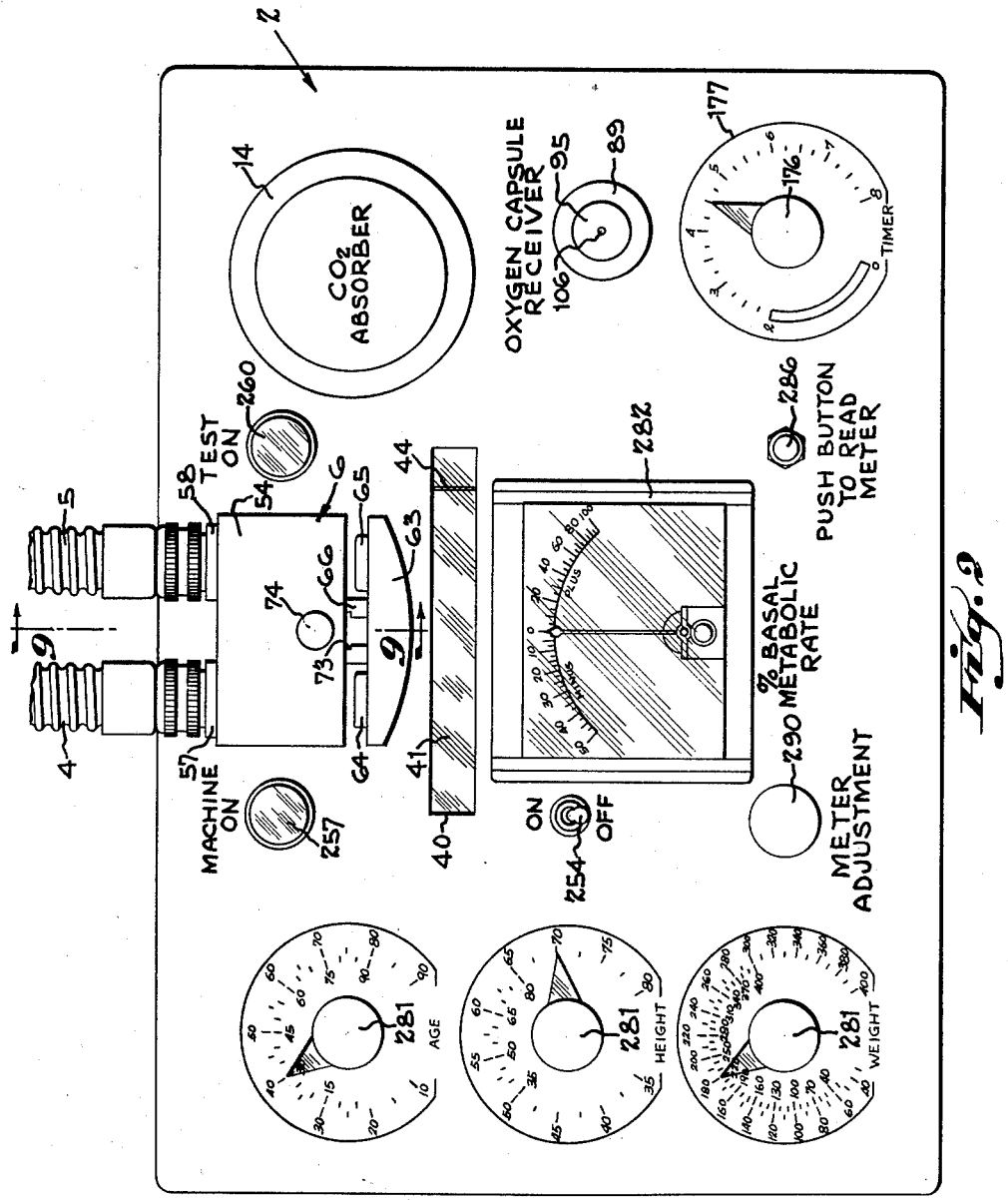

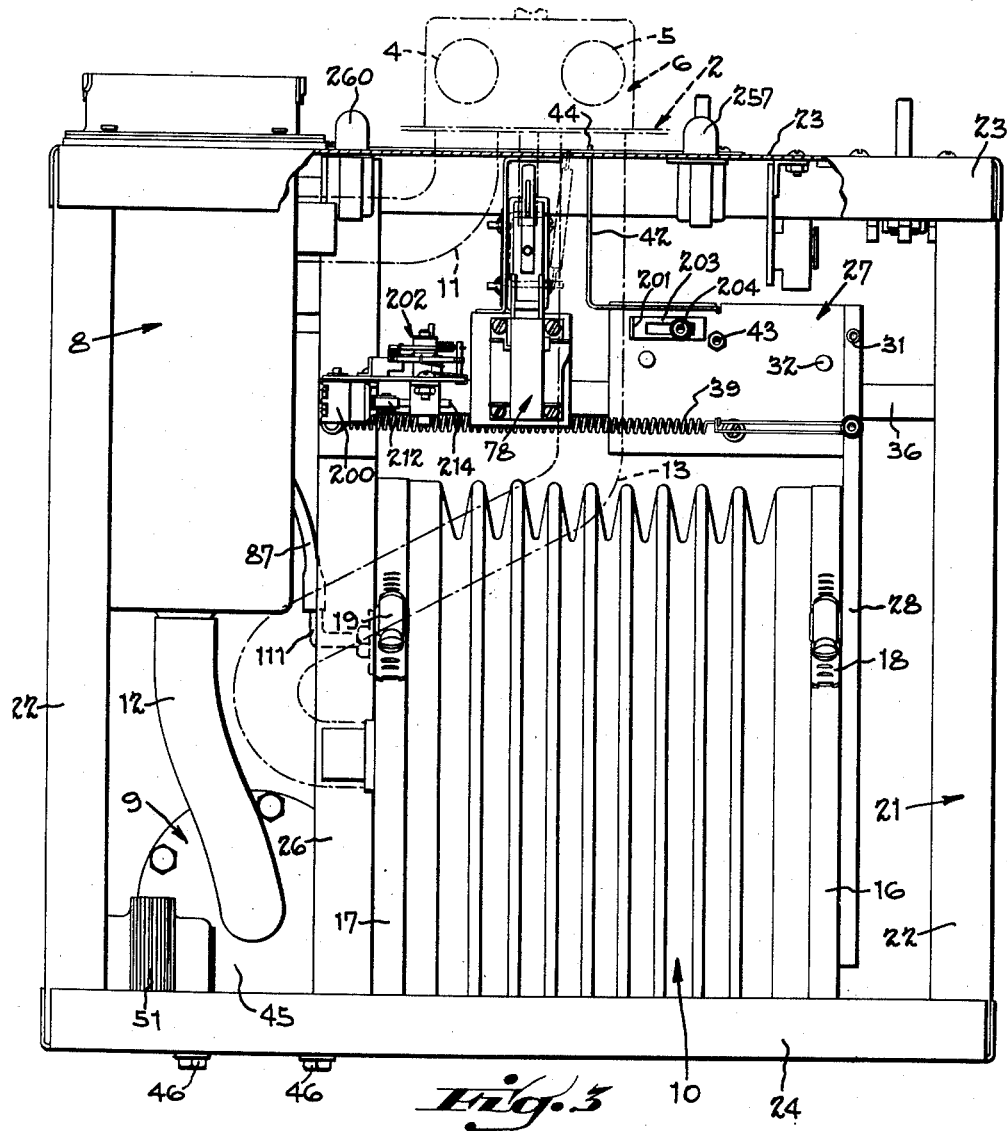

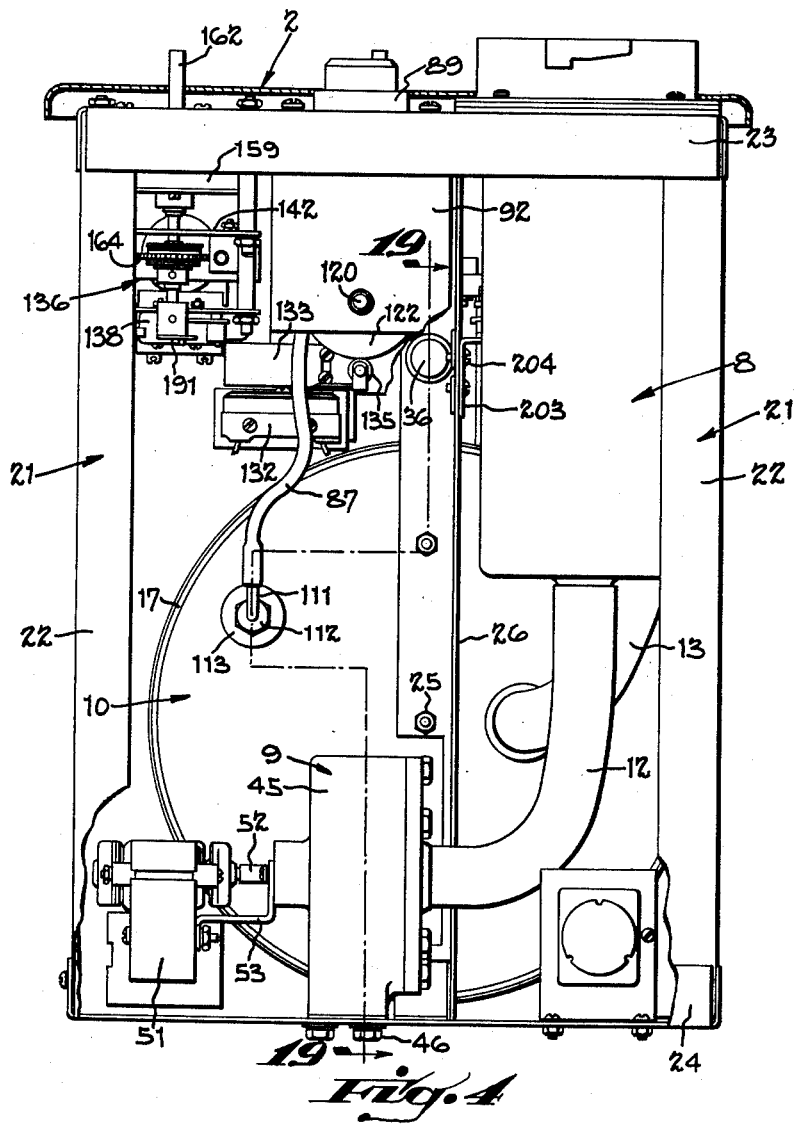

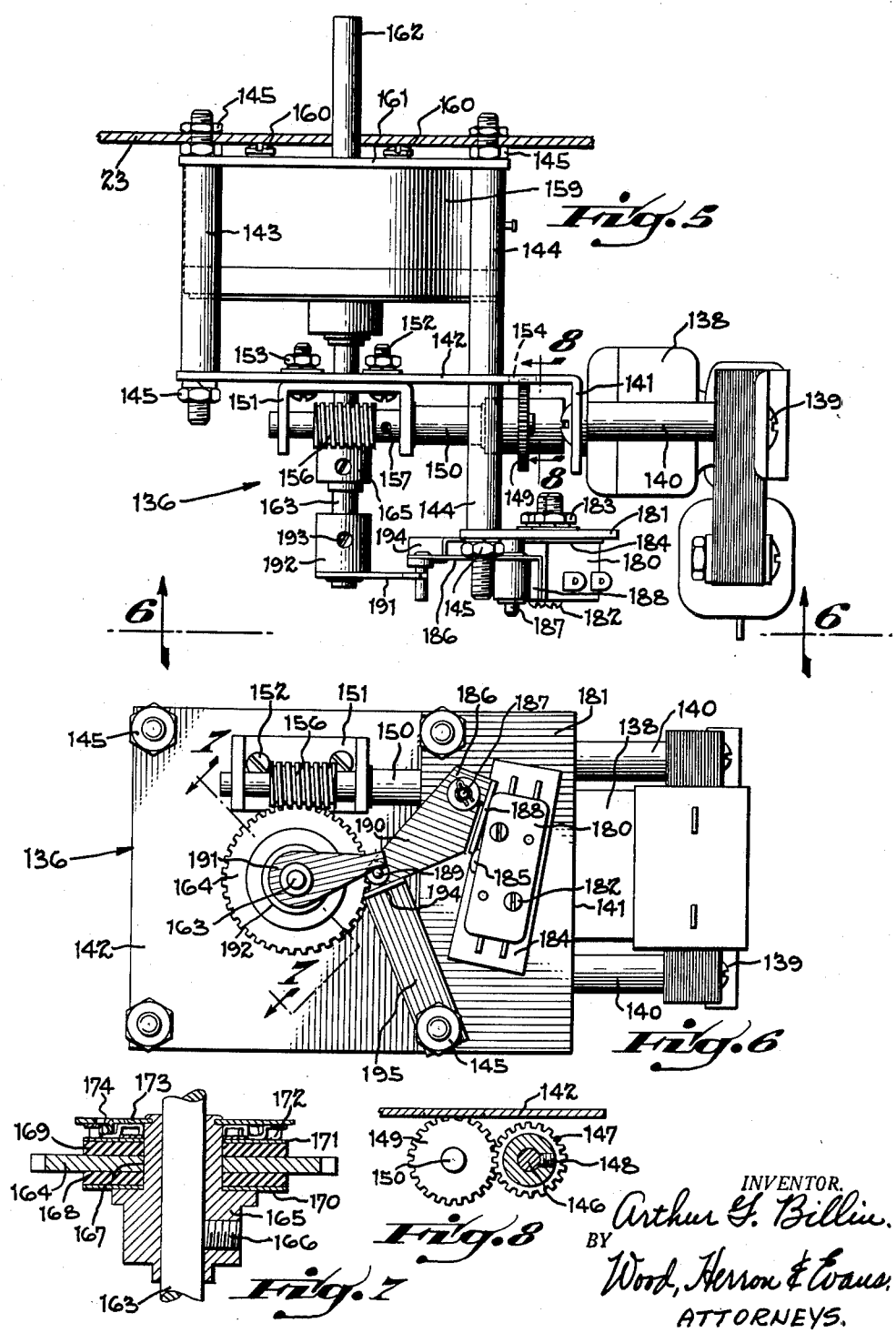

April 19, 1960 A. G. BILLIN 2,933,082
BASAL METABOLISM APPARATUS
Filed Nov. 18, 1955 12 Sheets-Sheet 7

INVENTOR.
Arthur G. Billin.
BY
Wood, Herron & Evans.
ATTORNEYS.

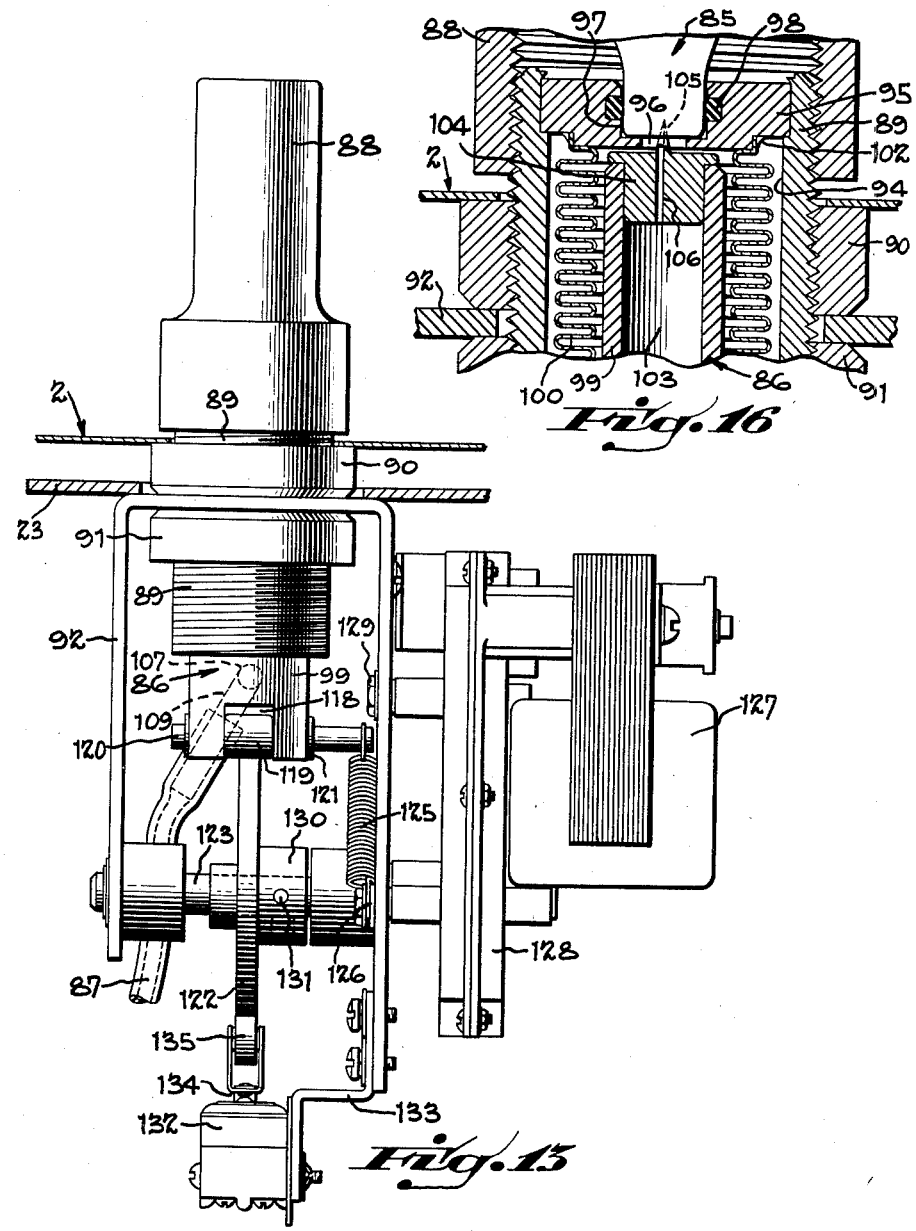

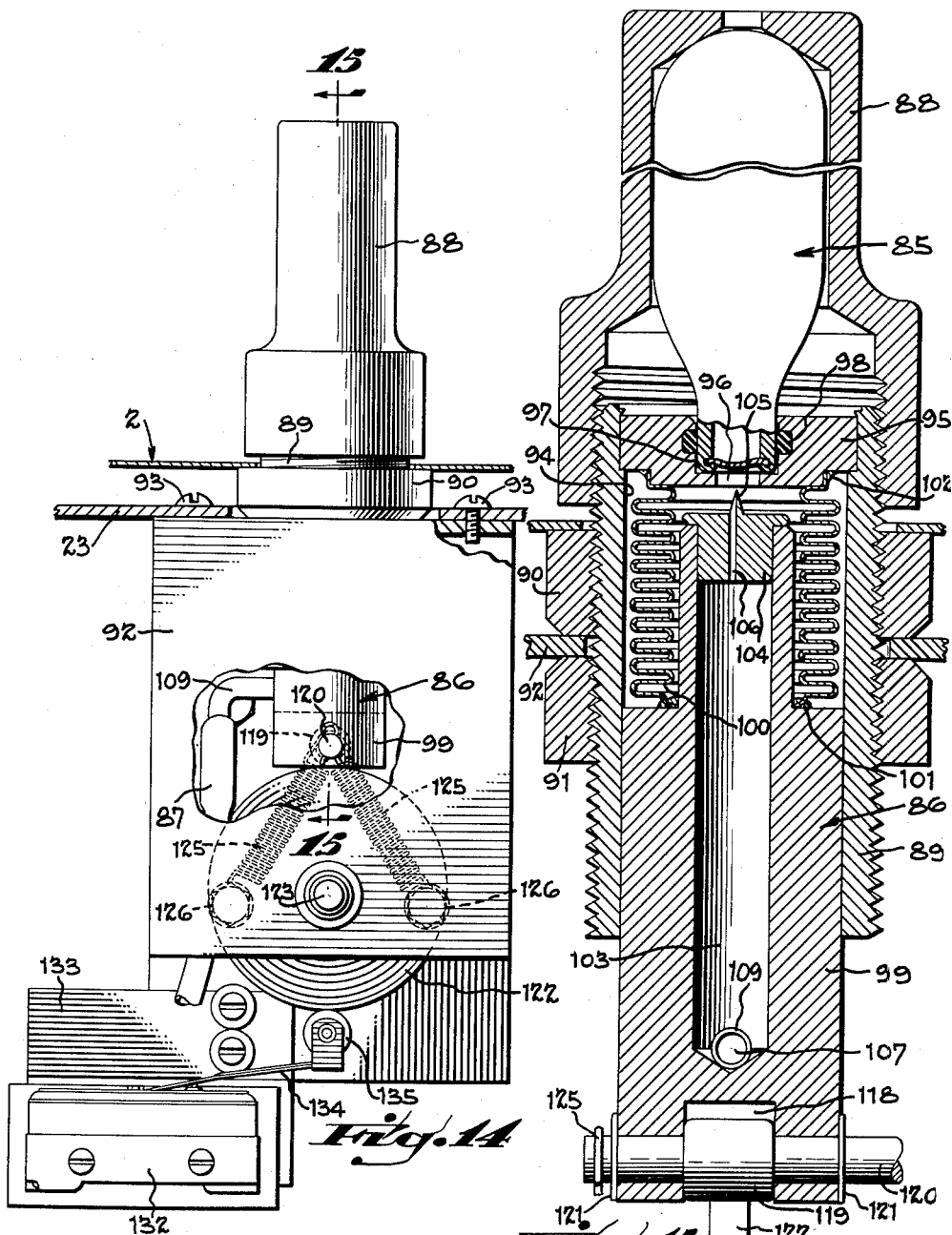

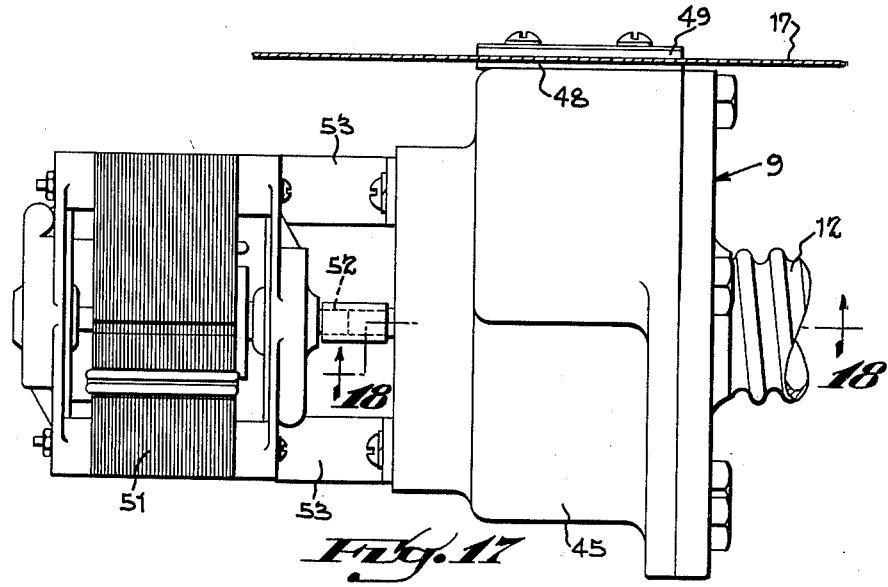
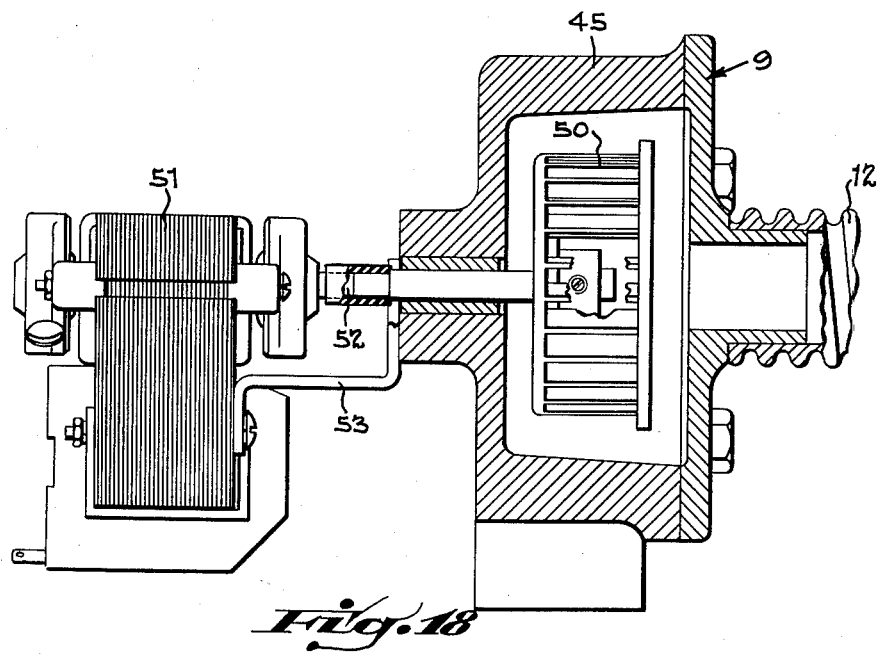

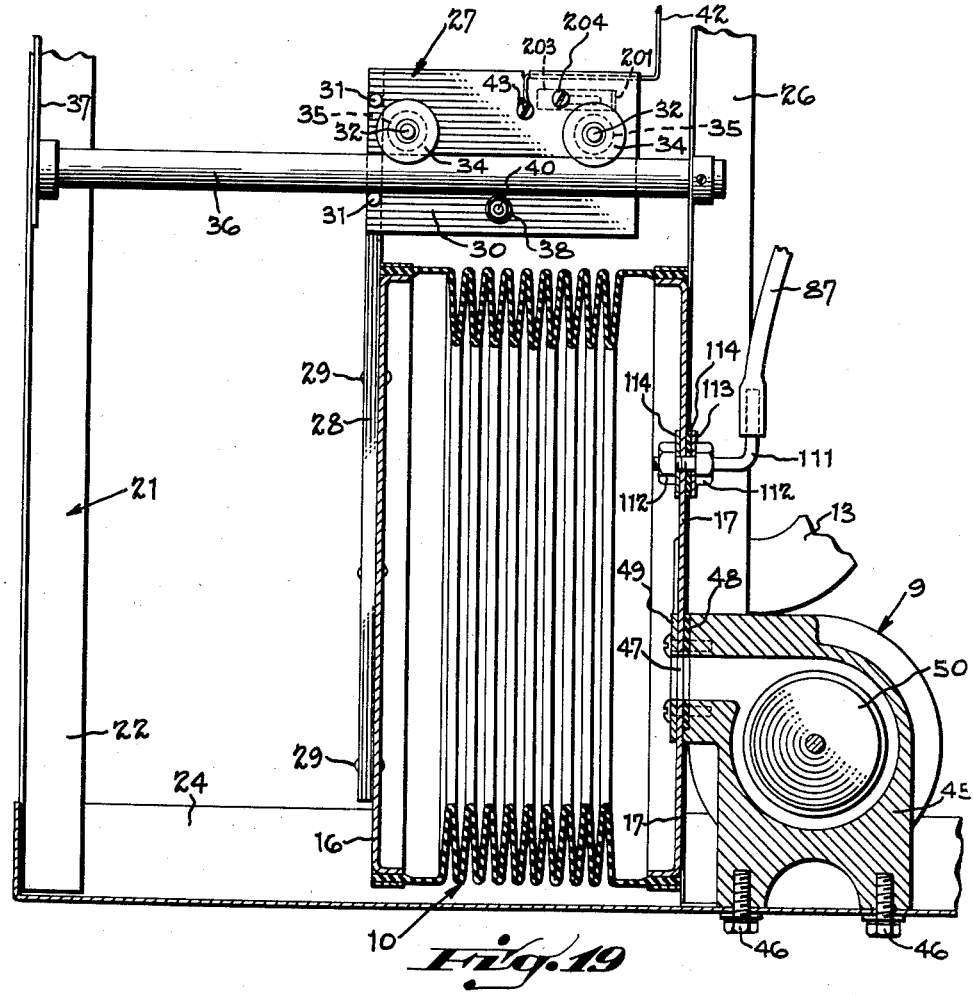

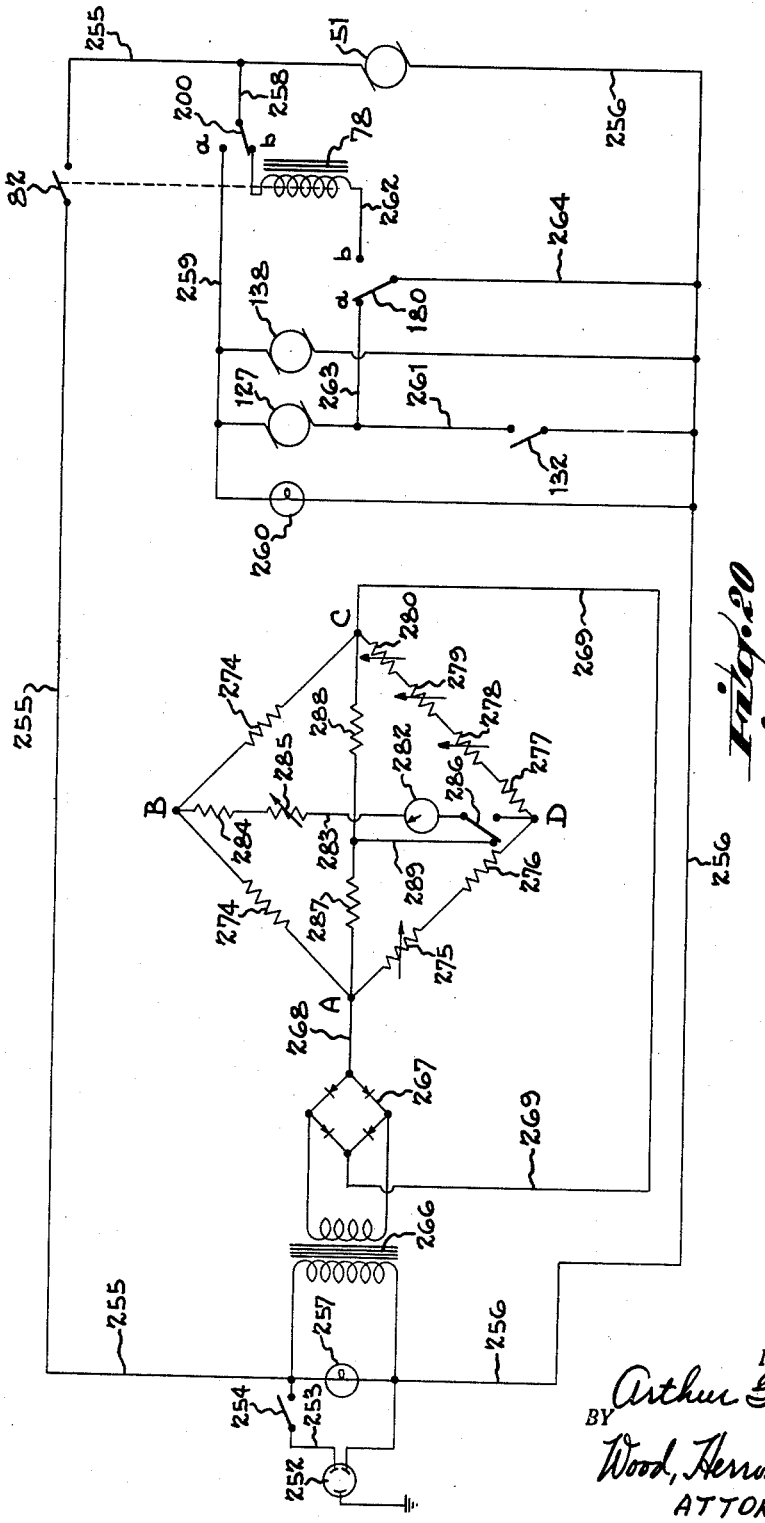

United States Patent Office 2,933,082
Patented Apr. 19, 1960

2,933,082
BASAL METABOLISM APPARATUS

Arthur G. Billin, Cincinnati, Ohio, assignor, by mesne assignments, to Liebel-Flarsheim Company, Rochester, N.Y., a corporation of Delaware Application November 18, 1955, Serial No. 547,715

22 Claims. (Cl. 128—2.07)

This invention relates to basal metabolism apparatus for comparing the metabolic rate of a given person undergoing test with the metabolic rate of a normal, healthy person of the same body area, age, and sex, in order that the diagnostician conveniently and rapidly may obtain information reflecting the physiological status of the patient.

Briefly, the apparatus of the invention comprises means for measuring the actual rate of oxygen consumption of a person undergoing test and automatically operable computing or translating means for comparing such rate with that at which a normal, healthy person of the same age, sex, weight, and height would be expected to consume oxygen. The present invention further contemplates computing or translating apparatus adapted for usage independently of the means through which the actual rate of oxygen consumption of a patient is determined, such that a diagnostician or technician accurately and conveniently may be provided with a comparison between an actual rate of oxygen consumption obtained from separate equipment, and the normal rate of oxygen consumption, as obtained from published data, whereby all mathematical calculations, interpretation of charts or the like is rendered unnecessary.

In its method aspects, the present invention contemplates determination of the actual rate of oxygen consumption of a patient and cybernetic comparison of that data with data reflecting normal metabolic rate for a patient of the same age, sex, weight, and height such that the metabolic rate of the patient may be expressed directly as a percentage greater than, equal to, or less than normal.

Basal metabolism apparatus of the type now in general use for diagnostic purposes comprises a mouth piece into and from which the patient breathes and a circulating system including a bellows, a circulating fan, and a carbon dioxide absorber connected serially with conduits respectively leading to and from the mouth piece. The bellows is equipped with a stylus for charting the movement of the bellows on a moving paper strip, and means is provided for admitting oxygen gas to the circulating system. As the patient breathes into and from the circulating system through the respective conduits, the bellows reciprocates accordingly. Meanwhile, however, through depletion of oxygen from the system in the course of breathing, the volume of gas in the system progressively is reduced, and the stylus, therefore, traces upon the moving strip a zig-zag line having an average slope indicating the rate at which the oxygen is consumed by the patient being tested.

To determine the oxygen rate in quantitative terms from the chart, the technician commonly lays a straight edge along the high or low points of the zig-zag line so as to average out local variations. The slope of this line in combination with a time scale in the direction of chart motion and a volume scale in the direction of bellows movement will give a reading of oxygen consumption in minutes per liter or liters per minute. Then, by computation of an empirical formula or by the use of a specially contrived slide rule, the technician determines the normal rate for a person of the same age, sex, and body area status, and mathematically compares the two.

In the conventional technique, it is apparent that errors easily may arise through inaccuracy in the interpretation of the chart, especially if the patient breathes unevenly during the test, through misadjustment of the apparatus, and through inaccuracy of the mathematics of the computations. Even though no errors arise, the translation of the data produced by the machine into useful diagnostic information is susceptible to variation by the technician and, at best, is slow and time-consuming.

A principal objective of the present invention has been to provide a method and apparatus through which the susceptibility toward errors may be eliminated and through which a doctor or technician may obtain, immediately after the test is completed, an accurate figure or result which reliably represents a true comparison of the actual metabolic rate of a patient with the normal rate applicable to that patient so as to make the basal metabolism test more generally useful and convenient to employ in physiological diagnoses than it heretofore has been.

Other objectives of the invention appear later in the specification. However, in order that the different aspects of the invention fully may be understood, a brief explanation of the accepted principles employed in metabolimetry is first requisite.

A person at rest in the post-absorptive state consumes oxygen at a given rate which is determined in part by the weight and height of the person, i.e., the body area, by the age and sex, and by the physical well-being of that person. Since oxygen consumption varies with energy output or muscular activity as well as with the food intake of the person prior to the test, it is common practice to obtain metabolism data while the patient is at rest and has properly been guided as to prior diet, or is in the so-called "basal" state.

For diagnostic purposes, the actual rate at which a given person consumes oxygen under specified conditions is generally unimportant except in comparison to the rate at which oxygen would be consumed by a normal, healthy person of the same sex, body area, and age characteristics. Therefore, in diagnosis, it is the practice to express the patient's basal metabolic rate (BMR) as a ratio between actual and normal, or as a percentage, thus:

$$\text{Percent BMR} = \left(\frac{\text{actual rate}}{\text{normal rate}} - 1\right) \times 100\%$$

Normal metabolic rates have previously been determined by a number of different workers, through careful measurements of the oxygen consumption of normal, healthy persons of different age, sex, weight, and height categories under basal conditions. From data obtained in these tests empirical formulae have been derived. Among these are formulae published by Harris and Benedict (Harris, J. A. and Benedict, F. G., A Biometric Study of Basal Metabolism in Man, Carnegie Institution of Washington, 1919, Publication No. 279); DuBois (DuBois, D. and DuBois, E. F. Clin. Cal. 10 Arch. Int. Med. 1916, 17, 863); Dreyer (Lancet, 1920, ii 289); Boothby (Boston Med. and Surg. Journal 1921, 185, 337); and others. Inasmuch as the Harris-Benedict system is widely used in the medical profession today, the Harris-Benedict system has been selected as a basis for illustrating a typical embodiment of the present invention, but it will be understood from what has been said and from what follows that the invention is not limited to the Harris-Benedict formulae.

The Harris-Benedict system expresses normal metabolic rates for males and females as follows:

For males: calories/hr.=2.8+.26W+.53H−.28A
For females: calories/hr.=27+.18W+.196H−.193A where W denotes weight in pounds, H denotes height in inches, and A denotes age in years.

For example, a male 6'-0" tall, fifty years old, and weighing two hundred pounds, on the basis of the Harris-Benedict system is said to have a normal metabolism of 78.9 calories per hour.

Except as a laboratory procedure, it is obviously impractical to attempt to measure directly the actual heat radiation or calorie production of a patient being tested. However, since the energy of heat production is due to oxidation of fat, carbohydrate, and protein taking place within the patient's body, the time-rate at which oxygen is consumed provides a clinical measure of the given individual's actual rate of heat production or energy expenditure. Thus, to determine the actual rate at which a patient undergoing test consumes oxygen, either the time within which a fixed quantity of oxygen is consumed, or the amount of oxygen consumed within a fixed period of time may be determined. By either procedure a so-called actual oxygen rate may be expressed, as liters per hour, or liters per minute, for example. Since it is known from prior published investigations that an average person, after fasting twelve to fourteen hours, produces 4.84 calories per liter of oxygen consumed, a basis for comparing the actual oxygen rate with the calories-per-hour normal rate expression employed in the chosen Harris-Benedict system may be established as follows:

$$\text{Calories/hr.} = \frac{60}{t} \times 4.84, \text{ or } \frac{290.4}{t}$$

where $t$ is the time in minutes required for the consumption of one liter of oxygen.

While the actual oxygen rate may be determined either by measuring the time required for the patient to consume a fixed weight or volume of oxygen or by the amount of oxygen consumed in a fixed time, the former procedure is preferred in the practice of this invention because the volumetric or weight measurement of an unknown quantity of gas and the translation of that measurement to standard pressure and temperature conditions is generally less feasible in clinical apparatus than the measurement of time required for the patient to consume a predetermined or fixed quantity of gas supplied from a suitable unit charge or cartridge. Small cartridges, each containing oxygen under high compression equal in amount to one liter under standard pressure and temperature conditions, are commonly available at low cost and serve as ready and convenient oxygen supply in the present improvement.

More specifically, in the preferred embodiment of this invention one liter of oxygen provided from a suitable cartridge source is admitted to a variable volume circulating system when the circulating system is in a predetermined volumetric state. Coincidentally, a timer is energized. As the test proceeds, the oxygen content of the system is depleted by the patient's breathing, and the timer is de-energized when the volume of the circulating system again reaches that predetermined state, i.e., when the liter of oxygen is used up. Therefore, the timer automatically measures the time, $t$, during which the patient undergoing test consumes the one liter of oxygen supplied to the circulating system.

The actual rate determination apparatus disclosed herein also includes improvements to eliminate timing inaccuracies which otherwise might result from uneven breathing of the patient at the start and termination of the test, and automatically operable mechanisms through which the doctor or diagnostician is relieved of all test duties except fixing the mouth piece to the patient, seeing that a filled oxygen cartridge has been installed in the apparatus for use, and pushing a button. These features through which automatic determination of actual oxygen rate is facilitated are later described in detail.

A second aspect of the invention relates to the utilization of the measured time, $t$, as a factor in computation of the caloric rate per hour and also to the comparison of that actual rate with the normal as computed from one or the other of the Harris-Benedict formulas, according to the sex of the patient being tested. In the preferred construction, an electrical computing system has been provided which includes a Wheatstone bridge having in one of its legs a resistance corresponding functionally to the quantity $$\frac{290.4}{t}$$

and having in another of its legs resistances conforming functionally to the values of the fixed and variable factors which appear in the Harris-Benedict equations, whereby the net state of balance or unbalance of the bridge at the end of the test constitutes a direct comparison of the actual rate of metabolism and the normal as reflected by the formula employed to determine the same. Thus, in apparatus for both determining the actual oxygen rate and comparing the same to give a single, final answer as percent BMR, the timer may be caused to drive a resistance calibrated to conform to the formula $$\frac{290.4}{t}$$

wherefore the resistance value constitutes an algebraic function of time according to the actual oxygen rate equation, while variable resistances conforming to the respective factors of the stated male and female Harris-Benedict equations may be set by the doctor by manipulation of appropriately calibrated dials according to the patient's age, weight, height, and fixed resistances may be included corresponding to the equation constants.

While a Wheatstone bridge type of circuit is particularly suitable for electrical solution of an equation of the Harris-Benedict type, those skilled in the art readily will comprehend the utilization of other types of electrical circuits which are suitable for solving equations in which normal metabolic rate is expressed by different formulas of the same or different degree. Also, it will be understood that the principles of this invention may be utilized through employment of a mechanical rather than an electrical system for computing normal metabolic rate.

The Wheatstone bridge may be either of the normally balanced or normally unbalanced type. If the former, then a variable resistance may be employed for balancing the circuit, in which event the reading of the magnitude of the variable resistance required to provide balance provides a direct comparison of actual and normal metabolic rates for the given patient. If the latter, as is preferred, then means is included for adjusting the voltage impressed across the resistance to standard conditions, and the final reading is indicated on a voltmeter. In either case, if the actual rate and the normal rates, as denoted by the resistances included in the circuit, are equal to one another, then the percent BMR is zero, commonly indicating that the patient's metabolism is equal to normal. If the actual rate, for example, is twice the normal, then the percent BMR is +100%, or if the actual rate is only one-half the normal, then the percent BMR will be −50%, either reading commonly denoting an abnormal physiological condition. The apparatus, therefore, provides the diagnostician with a final answer immediately at the end of the test and eliminates mathematical computations, the interpretation of charts, or the operation of slide rules, as are necessary in all basal metabolism apparatus known heretofore.

The computation apparatus of this invention may be utilized separately or independently of the oxygen consumption apparatus to determine percent BMR or equivalent indicia from external data supplied to it by mere dial manipulation. Thus, should a diagnostician prefer to determine oxygen rate from apparatus of the conventional type, then the computer of the present invention is effective to solve the normal rate equations and provide a final result much more rapidly than by the conventional procedure.

A typical embodiment of the invention constructed in conformity with the principles which have been just described is illustrated in the accompanying drawings in which:

Figure 2 is a plan view looking at the panelboard of the machine;

Figure 3 is a side view showing the bellows and associated apparatus in vertical section;

Figure 4 is an end view of the bellows and associated apparatus showing some of the parts in vertical section;

Figure 5 is a vertical elevation of the timer mechanism;

Figure 6 is a plan view looking up at the bottom of the timer apparatus, as indicated by the line 6—6 of Figure 5;

Figure 7 is a cross-sectional view taken on the line 7—7 of Figure 6;

Figure 8 is a cross-sectional view taken on the line 8—8 of Figure 5;

Figure 9 is a vertical sectional elevation of the control valve of the circulating system as taken on the line 9—9 of Figure 2;

Figure 10 is a cross-sectional view taken on the line 10—10 of Figure 9;

Figure 13 is an elevation showing the gas cartridge receptacle and piercing apparatus;

Figure 14 is an end elevation of the elements shown in Figure 13 in side elevation;

Figure 15 is a cross-sectional view taken on the line 15—15 of Figure 14;

Figure 16 is a fragmentary view similar to Figure 15 showing the apparatus for piercing the gas cartridge;

Figure 17 is a plan view of the gas circulating blower and drive therefor;

Figure 18 is a cross-sectional view taken on the line 18—18 of Figure 17;

Figure 19 is a cross-sectional view through the bellows of the gas circulating system, as taken on the line 19—19 of Figure 4; and Figure 20 is a circuit diagram of combined controlling and computing circuits of the apparatus.

Figure 1:
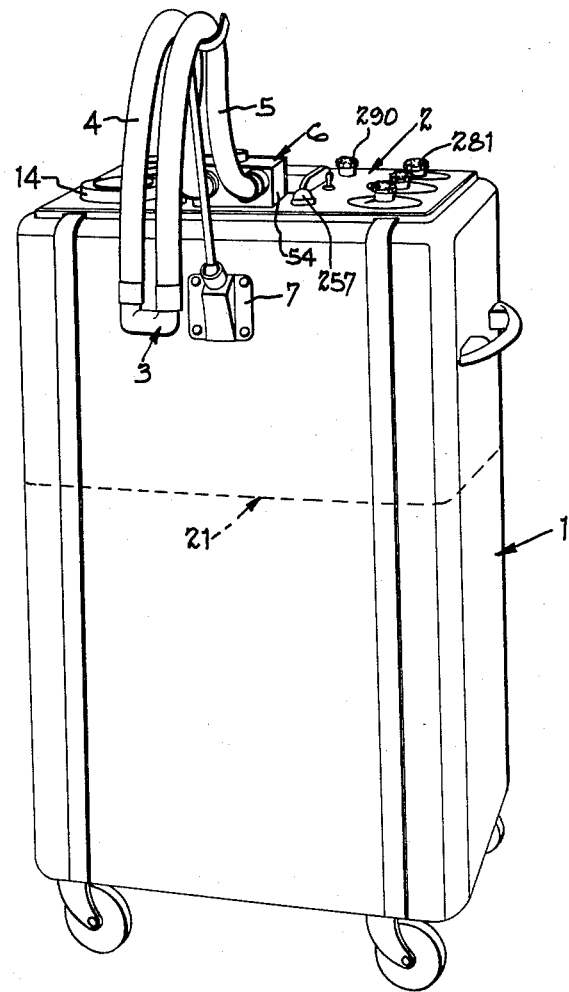
Figure 1 is a perspective view of the metabolism apparatus taken from the patient's side of the machine.

The apparatus illustrated in the drawings embodies means conjointly operable for determining the actual rate of oxygen consumption of a patient being tested, means for calculating the normal rate applicable to that patient, and means for automatically comparing the two. The entire apparatus may be housed in a sheet metal cabinet, indicated generally at 1, equipped with roller wheels whereby the unit may be brought to the side of a bed on which a subject to be tested is resting. Although the operating equipment occupies only the upper part of the cabinet, this type of housing provides a panelboard 2 at a convenient working level, but the lower portion of the cabinet may be omitted if a table model is desired. The control panel 2 carries adjustable dials for setting age, weight, and height data prior to the test, a meter or indicator by which the final result of the test is shown, and other elements as subsequently described. For the purpose of the present description, the respective portions of the apparatus which respectively determine the actual oxygen rate and which compute the normal rate and compare it with the actual rate are described successively in the description which follows.

GAS SYSTEM

The circulating system into and from which the patient being tested exhales and inhales comprises a mouth piece or mask, indicated generally at 3, which is of the conventional type adapted to fit in or over the mouth or face in gas-tight connection while the nostrils are closed by a clamp or other suitable means. Flexible conduits 4 and 5 lead from the conventional Y-tube of the mouth piece to a control valve indicated generally at 6 which is normally open whenever the test is not in progress to place conduits 4 and 5 in communication with the atmosphere but which, when closed at the start of and during a test, places the mouth piece conduits 4 and 5 in series communication with the gas circulating system housed in the cabinet 1 and completely closes the system from outside air. A support arm 7 adjustably extending from a wall of the cabinet provides support for conduits 4 and 5 both during and after use of the equipment.

Within the housing, the gas circuit includes a carbon dioxide absorber indicated generally at 8, a circulating fan or blower indicated generally at 9, and an expansible chamber or bellows indicated generally at 10. A conduit 11, which communicates with the mouth piece conduit 4 at the valve 6, extends to the carbon dioxide absorber 8, a conduit 12 extends from the carbon dioxide absorber to the inlet side of the blower 9, and a conduit 13 extends from the bellows 10 to valve 6 wherein it communicates with the other mouth piece conduit 5.

The carbon dioxide absorber 8 may be any suitable apparatus for absorbing or sequestering the carbon dioxide content of the gas passing through the circulating system. As shown, this member is in the form of a corrosion-resistant canister having an inlet nipple near the top to which the conduit 11 is connected and an outlet nipple at or near the bottom to which the conduit 12 is attached. The canister is open at the interior and, as shown, is adapted to receive a porous charge of soda-lime for converting, into carbonates, the carbon dioxide contained in the gas passing through the canister, although any other device for sequestering or removing carbon dioxide may be employed. As in conventional metabolism apparatus, therefore, the carbon dioxide absorber 8 removes from the system the carbon dioxide which the patient breathes into it during test, thereby depleting the gas circulating in the system of that component which has resulted from the physiological combustion of the patient's oxygen intake.

In the present embodiment, canister 8 extends upwardly through the top panel 2 of the cabinet 3 and is fitted at the top with a removable cap 14 which forms a gas-tight connection with the body and which is held by a bayonet-type catch or other suitable cap fastening means. Removal of the cap permits the soda-lime charge of the canister to be replaced from time-to-time as required.

Fan 9 induces gas to flow from the carbon dioxide absorber 8 into conduit 12 and propels the gas into the bellows 10 whence it returns through conduit 13 to the atmosphere if valve 6 is open or to the mouth piece through conduits 4 and 5 when valve 6 is closed.

Bellows 10 is of sylphon construction, comprising a tube made of rubber or the like having annular corrugations so as to be freely flexible in longitudinal direction. The ends of the bellows tube embrace end plates 16 and 17 made of aluminum or other suitable material, the ends of the bellows tube being held in place over suitable flanges on the end plates by contractible draw bands 18 and 19 which are equipped with conventional screw-type draw-in fasteners so as to establish gas-tight connections between the bellows and the end plates.

A support framework indicated generally at 21 is located at the upper part of the cabinet 1 to mount the bellows and the other parts of the equipment. This structure comprises corner angle irons 22 which are suspended by spot welding from depending edge flanges of a top frame panel 23, while a bottom pan 24 is fastened to the lower ends of the corner posts 22. For convenience of manufacture, the framework 21 is built up as a unit upon which various parts are mounted during assembly. The panelboard 2 constitutes a separate plate surmounting the framework and is held thereto in spaced relation by suitable washers as is shown in Figure 3.

The bellows assembly 10 is located above the bottom pan 24, and one of the bellows end plates, 17, is fixed by means of bolts 25 against one face of an angle iron mounting post 26 which extends vertically from the bottom pan 24 to the top frame panel 23. Therefore, end plate 17 of the bellows is immovable. The opposite end plate 16 is movable to allow the bellows to expand or contract volumetrically while a test is being conducted.

The free end of the bellows is supported for reciprocating movement by a truck indicated generally at 27. Thus, end plate 16 has an arm 28 extending upwardly from it in a generally vertical direction (Figure 19), the arm being fastened to the end plate by suitable screws or rivets 29. Above and overlying the bellows a roller carriage plate 30 is fastened rigidly to the arm 28 as by screws 31, 31. Axles 32, 32 extend laterally from the plate 30 in spaced relation to one another to support rollers 34, 34 which are rotatably mounted as by anti-friction bearings 35. The rollers track upon a smooth guide rod 36 which extends rigidly in a horizontal direction from a bracket piece 37 depending from an edge flange of the upper frame panel 23 to the vertical post 26 against which the immovable end plate 17 of the bellows is buttressed. The peripheries of rollers 34 are concave to complement the cross-sectional contour of the guide rod 36 and a supplemental guide roller 38, mounted on an axle 40 which extends from plate 30 beneath the guide rod 36 intermediate rollers 34 tracks against the lower face of the guide rod to insure smooth movement of the carriage and proper engagement of rollers with rod.

End plate 16 of the bellows is biased toward end plate 17, i.e. in bellows-collapsing direction, by a tension spring 39 fastened at one end to the arm 28 and at the other to post 26. The spring is yieldable under the exhalation pressure of a patient's breath.

Top panel 2 of the apparatus has a window opening 40 cut through it within or beneath which a glass or transparent plastic sheet 41 is mounted, and carriage plate 30 supports a wire finger or pointer 42 which is fastened in place by a screw 43. The upper portion of finger 42 passes through a suitable slot in top frame panel member 23 above which it is bent laterally at a level just below the window 41 so as to extend across the window. Pointer 44 thus provides a visible indication of bellows movement and bellows position, to which the operator may refer should the need arise.

Circulating fan 9 may be of the blower-wheel type comprising a housing 45 which is mounted on the base pan 24 by means of base bolts 46. The discharge opening of the fan is in alignment with an opening 47 in the fixed end plate 17 of the bellows. A gasket 48 is placed between the two parts at the outside of the bellows, while at the inside a washer 49, placed around the opening 47, receives suitable fastening screws which pass through the end plate and into the fan housing to hold the fixed end plate and fan outlet in gas-tight connection. Blower wheel 50 of the fan is driven by a suitable electric motor 51 through the drive shaft 52. Preferably, the motor is resiliently mounted upon the fan housing by brackets 53 rather than upon the bottom pan 24 to reduce vibration (Figure 18).

Valve 6 in the construction shown (Figures 9 and 10) comprises a valve body 54 made of metal or plastic and is mounted on the top panel 2 of the cabinet by bolts 55 which carry spacers 56 residing between panel 2 and top frame panel 23. The body threadedly receives inlet and outlet nipples 57 and 58 to which conduits 4 and 5 leading from the mouth piece respectively are coupled. The valve body contains through-bores 59 and 60 which pass respectively from the nipples 57 and 58 to the other side of the body where they communicate with the atmosphere, and the lower portion of the valve body contains transverse passages 61 and 62 respectively intersecting through-bores 59 and 60. Passages 61 and 62 carry nipples (not shown) to which conduits 11 and 13 respectively are connected at the inside of the housing.

The passageways 59 and 60 are opened and closed by means of a cap 63 which carries resilient valve seats 64 and 65 spaced apart for alignment with the open ends thereof. Cap piece 63 is slidably mounted for movement toward and from the valve body by spaced rods 66, 66 which project rigidly therefrom into bores 67, 67 of the body intermediate the conduits 59 and 60. Cap 63 is biased to outward or open position by compression springs 68, 68 which respectively reside in the bores 67, 67 to bear against the ends of counter-bores 69, 69 of the rods 66, 66.

In the structure shown in the drawings, the gas system and the patient may communicate with the atmosphere through both passage 59 and passage 60 of the valve body, but it will be understood that either one of these may be omitted so that atmospheric communication occurs only through the other if desired. The main purpose is to provide free passage of atmospheric air to the face mask after a test is completed and before the face mask has been removed so that the patient will not at that time experience a feeling of suffocation which would otherwise occur through the breathing into and from a closed gas system which has been depleted of oxygen during the test.

To hold the cap piece 63 in the valve-closed position, valve body 54 has a transverse bore 70 located centrally intermediate the rods 66, and a control or latch rod 71 is slidably mounted therein. This rod is of such diameter that it would normally intersect the contours of the arms 66, but the central portion is provided with a groove 72 which clears the arm peripheries when the groove is in vertical alignment therewith. In addition, arms 66 have their sidewise portions slotted as at 73, 73 sufficiently to clear the nominally intersecting portions of the control rod diameter when cap piece 63 is pushed in to close the ends of through-bores 59 and 60. Therefore, when groove 72 of control rod 71 is in alignment with arms 66, the cap piece is free to move outwardly under the influence of springs 68, placing conduits 4 and 5 in communication with the atmosphere at the open ends of through-bores 59 and 60. When valve cap 63 is pushed inwardly sufficiently to bring the clearance slots 73 of the arm 66 into alignment with the lower enlarged diameter portion of the control rod, then the control rod may move upwardly and the arms will be locked against outward movement by engagement of the ends of the slots 73 with the enlarged diameter portion of the shaft. In this position of cap 63, conduits 4 and 5 communicate with conduits 11 and 13 through the transverse bores 61 and 62 of the valve body.

The upper end of control rod 71 terminates in pushbutton portion 74 above the valve body 54, and the lower portion extends below the top panel 2 of the cabinet through an opening in top frame panel 23 beneath which it is connected by a yoke 76 to an armature 77 of a solenoid indicated generally at 78. A tension spring 79 having one end suitably fastened to the upper frame is connected at its opposite end to the armature 77 of the solenoid, and the spring therefore biases the control shaft 71 toward valve-locking position. The lower portion of the control rod 71 also carries a stop collar 80 fastened by a screw 81 which bears against the top frame panel 23 to limit the upward movement of the control rod.

Hence, to close the valve and establish gas connection of the mouth piece 3 with the circulating system, it is only necessary to push the cap piece inwardly. To manually release the valve at any time, it is only necessary to depress the button 74, but solenoid 78 releases it automatically upon completion of a test as described at a later point. In this connection it is here appropriate to note a micro-switch 82 mounted on a bracket 83 suspended from top frame panel 23 on which the solenoid 78 also may be mounted. The micro-switch is actuated by a finger 84 which is fastened to the valve cap 63 by screws 84a and is open when the cap piece is in open position.

OXYGEN SUPPLY

A measured quantity of oxygen gas is admitted to the circulating system in conducting a metabolism test. This oxygen preferably is supplied from a metal cartridge in which a weighed amount of the gas is contained under a high degree of compression. Cartridges are commercially available containing one liter of oxygen within a close tolerance; variation of plus or minus five percent or less has been found suitable in the operation of the present apparatus although, obviously, the smaller the tolerance the greater the inherent accuracy of result.

The oxygen supply apparatus is shown best in Figures 13–15 and 19 and comprises, generally, the metal capsule 85 containing the compressed gas, a mechanism indicated generally at 86 for piercing an end of the capsule to release the gas, and a conduit 87 for delivering the released gas to the interior of the bellows 10.

Cartridge 85 is received in a cartridge holder 88 which terminates in a skirt internally threaded to engage the upper threaded portion of a receiver member 89. The receiver 89 projects through top panel 2 and top frame panel 23 whereby cartridge holder 88 is conveniently disposed on panel 2 for manipulation incidental to the insertion of a filled oxygen cartridge prior to the conducting of a test.

Receiver 89 at its exterior carries nuts 90 and 91 engaging opposite sides of a U-shaped bracket 92 which is bored at the top to clear the socket member 89 and which is fastened to the underface of top frame 23 by means of screws 93, 93.

The receiver 89 is bored internally as at 94, and at its upper end carries a plug 95 which is brazed or otherwise suitably fastened in place. At its central portion, end plug 95 has a through-bore 96 above which is a counter-bore forming a socket 97 to receive the neck puncturable end of the cartridge. The socket hole is also recessed annularly to receive an O-ring 98 or compression gasket which embraces the neck of the cartridge upon insertion thereof in the socket. When the holder 88 is screwed downwardly, the cartridge is seated in gas-tight connection with the socket 97.

A piston 99 is slidably mounted in the internal bore of the receiver 89. By counter-turning, the upper end of the piston is of reduced diameter, and a flexible metal Sylphon 100 is installed in the annulus around the piston neck. One end of the bellows is fastened in gas-tight connection to the piston shoulder as at 101 while the opposite end is similarly fastened to the internal face of the end plug 95, as at 102. The Sylphon 100, therefore, constitutes a gas-tight but flexible interconnection between the fixed end plug 95 and the movable piston 99.

Piston 99 is bored internally from the end within the sylphon, as at 103, and a piercing pin 104 is mounted at the open end of the bore 103 beneath the socket 97. The pin is in the form of a shouldered plug having a needle-like projection 105 extending upwardly from it, while a small gas escape passage 106 extends through the plug and through part of the cross-sectional contour of the needle projection 105. A cross bore 107 through the piston wall at the lower end thereof communicates with the internal piston bore 103, and at the outside of the piston, cross hole 107 carries a nipple 109 to which delivery conduit 87 is connected. Conduit 87 has its opposite end connected to a nipple 111 which passes through end plate 17 of the bellows 10. Nipple 111 is threaded externally to carry nuts 112, 112 which bear against washers 113, 113 placed over gaskets 114, 114 at opposite sides of the end plate wall.

From this construction, it will be seen that a cartridge may be placed in the holder 88 and held thereby against the socket in the end plug 95 while the piston is in the down position in which needle 105 is spaced from the end of the cartridge. When the piston 99 is moved upwardly, needle 105 punctures the end of the cartridge, and the compressed oxygen gas thereof escapes through passage 106 into the piston bore from which it expands into the bellows 10 through the cross bore 107, conduit 87, and nipple 111. The adjustability provided by the lock nuts 90 and 91 permits the position of cartridge seat 97 to be raised or lowered with respect to the upward limit of travel of needle 105 as may be required initially in the assembly of the apparatus.

In order that piercing of the oxygen and attendant liberation of the gas to the circulating system may be coordinated automatically with the functioning of the other parts of the apparatus, as is described later, piercing plunger 99 is preferably actuated by power means in the embodiment disclosed. For this purpose, the lower end of the piston is provided with a slot 118 which receives a roller 119 rotatably carried on a cross shaft 120, the latter being held against axial movement by lock washers 121, 121 bearing against opposite sides of the plunger 99. Roller 119 tracks upon the periphery of a cam 122 which may be in the form of a cylindrical disk eccentrically mounted upon an axle 123 having its respective endwise portions journaled in the spaced arms of the U-shaped bracket 92. One end of each of a pair of tension springs 125, 125 is fastened to a projecting portion of shaft 120, while the opposite end of each tension spring is hooked over a screw 126 mounted in an adjacent arm of the bracket. The tension springs straddle the cam 122 but hold the roller 119 of the plunger 99 against its periphery.

Piercing cam 122 is driven from an electric motor 127 (Figure 13) through a speed reduction gear train located in a gear box 128, the entire motor and gear box assembly being fastened to an exterior face of one of the side arms 92 of the U-shaped bracket, as by bolts 129. The output shaft of the gear train in the box 128 is coupled to the axle 123 and hub 130 of the piercing cam is also pinned to it, as at 131. Conventional gearing may be employed in the gear box 128 to provide for rotation of the piercing cam through one complete revolution in approximately four seconds.

An interlock or piercing cam positioning switch 132 of micro-switch type is mounted on a bracket 133 which, in turn, is fastened to the lower portion of one of the side arms 92 of the U-shaped bracket. Switch 132 is equipped with a switch-actuating arm 134 having a roller 135 bearing against the periphery of piercing cam 122 at a point on the periphery thereof opposite the piercing cam 122 carried by the plunger 99. The operation of switch 132 is described at a later point herein.

From this description, it will be seen that a half revolution of the piercing cam 122 by the drive motor will cause movement of the plunger 99 from the receded position, in which it is shown in Figure 15, to the piercing position in which it is shown in Figure 16, thereby causing liberation of the predetermined volume of oxygen gas from the cartridge to the bellows system. The gas delivery is accomplished within a second or so, and the bellows thereupon expands from a relatively collapsed state, approximately as shown in Figure 19, to a relatively expanded state as indicated in Figure 3.

TIME MEASUREMENT

The elements of this part of the structure are shown in Figures 5–8, 11, and 12. The timer assembly, indicated generally at 136, is located adjacent one of the corner posts 21 of the frame beneath the top panel 2.

Timing is conducted by the use of a synchronous alternating current motor 138 of the self-starting kind ordinarily used in electric clocks. This motor is mounted by screws 139 upon studs 140 which project from a face of a bracket portion 141 bent laterally from a mounting plate 142. Mounting plate 142 is supported from the top frame panel 23 by pairs of depending studs 143, 144 which threadedly carry fastening nuts 145 at their extremities, posts 143 terminating at the plate 142 while posts 144 extend below it.

Output shaft 146 of the motor 138 extends through bracket portion 141, beyond which it carries a spur gear 147 which is fastened by a set screw 148 (Figure 8). Gear 147 mates with a gear 149 which is fixed to a jack shaft 150 rotatably journaled in spaced depending legs of a U-shaped bracket 151. The bracket is fastened to the lower face of mounting plate 142 by means of screws 152 carrying nuts 153 at the opposite side of plate 142. (A clearance slot 154 is provided in the mounting plate to clear the upper circumferential portion of the driven spur gear 149.) Jack shaft 150, intermediate the legs of the U-shaped bracket 151 carries a worm 156 fastened in place by a set screw 157.

A potentiometer or variable resistance unit 159 is fastened by screws 160 to a top plate 161 supported on the corner posts 143, 144 of the timer assembly. The potentiometer unit includes a double-ended drive shaft having an upper portion 162 which projects through the top panel and top frame panels 2 and 23, and a lower portion 163 which projects below mounting plate 142 and through a worm wheel 164 which is in mesh with worm 156.

Worm wheel 164 is not fastened rigidly to the lower potentiometer shaft 163 but is interconnected thereto through a slip or friction clutch shown sectionally in Figure 7. This arrangement permits the upper potentiometer shaft 163 to be adjusted manually even though the worm wheel 164 is locked against its driving worm.

The slip clutch shown in the drawings comprises a hub 165 which is fastened to the lower potentiometer shaft portion 163 by a set screw 166. Worm wheel 164 is rotatably journaled on a counter-turned portion 167 of the hub, and the opposite faces of the worm wheel are engaged by respective friction disks 168 and 169. The lower face of the friction disk 168 is supported against a metal washer 170 which is seated against the shoulder of the hub at the end of the counter-turn while a metal washer 171 is placed against the upper face of the other friction disk 169. A spring-washer 172 of the radially corrugated type is interposed between washer 171, and a thrust plate 173 is fastened rigidly to the upper end of the hub 165 by spinning or the like. A finger 174, fastened to the thrust plate 173, projects downwardly against one of the corrugations of the spring 172 so as to prevent it from rotating. This frictional interconnection provides a power drive to the potentiometer unit 159 through its lower shaft portion 163 from spur gears 147 and 149, the worm 156, and worm wheel 164.

The upper potentiometer shaft portion 162 carries an operating knob and pointer 176 which is served by a time scale 177 on the panel 2. The pointer, therefore, may be set manually through the rotation which is permitted by clutch slippage.

In order that the time scale 177 may be calibrated in minutes, the drive gearing from the synchronous motor (i.e., 60 cycle) is designed to drive the potentiometer shaft at the rate of approximately one revolution in nine minutes.

At the start of a metabolism test, the pointer 176 is at the zero point on the scale. As the metabolism test proceeds, the pointer is driven by rotation of shaft 163 in a clockwise direction. By the automatic controls which are explained later, the pointer indicates the time which a patient undergoing test required to consume the measured quantity of oxygen admitted to the circulating system from the bellows. Prior to the inauguration of a succeeding test, the slip clutch mechanism just described permits the pointer to be rotated in a counter-clockwise direction to the zero starting position.

A valve interlock and piercing cam control switch, 180, the operation of which is later explained in connection with the circuit of the apparatus, is mounted on a plate 181 by means of screws 182 carrying nuts 183 at the lower extremities of the two studs 144 which project below plate 142. A sheet of insulation 184 is interposed between the bottom of the switch and the mounting plate.

Switch 180 is of the single pole, double throw type self-biased toward one position and includes an actuating button 185 which is served by a bellcrank 186. This member is pivoted on a stud shaft 187 projecting rigidly from the mounting plate 181. One arm, 188, of the bellcrank, resilient by virtue of a transverse slot, engages the switch-actuating button 185, while the opposite arm 190 carries a trip finger 189. This member is engageable by a lever arm 191 having a hub 192 fastened by a set screw 193 to the lower projecting portion 163 of the potentiometer shaft.

Lever arm 191, as shown in Figure 6, bears against one side of the bellcrank arm 190. Movement of the bellcrank beyond the point at which switch 180 is actuated, which conforms to zero setting of pointer 176 at the top panel 2, is prevented by a fixed stop 194. This may be a laterally bent portion of a metal strip 195 which is held in place by the nut on the adjacent corner post 143.

TEST START AND STOP MECHANISM

When oxygen is admitted to the bellows for consumption by a patient during test, the bellows expands and, during test, the bellows also oscillates in consequence to variations of the system pressure as a result of the patient exhaling into the system and inhaling from it. Thus, the statistical volume of the circulating system changes from moment-to-moment while the test is in progress and also decreases from the start to finish of the test. Because of these variations, precise measurement of the time required for consumption of a predetermined quantity of oxygen admitted to the system is difficult. However, in accordance with the present invention, accurate measurement of time is accomplished by measuring time from that moment at which the bellows system is in a predetermined volumetric state before admission of oxygen until the bellows has regained the same volumetric status which it had at the commencement of the test after the admitted oxygen has been consumed. Since admission of oxygen from the capsule requires only a matter of a second or so, the admission of oxygen may be caused to occur at or promptly after the start of the timing period.

Accurate measurement of time is complicated particularly by fluctuations which are apt to occur in the breathing of certain patients through their mere subjection to a test. As a patient breathes rhythmically into the gas system of the apparatus, the bellows oscillates. If the rhythm and magnitude of the patient's breathing were uniform, then actual metabolic rate could be determined accurately by admitting a predetermined charge of oxygen to the bellows while its movable member is in a predetermined position or when it passes a given point, and measuring the time required by the patient to remove oxygen from the bellows to such extent that its movable member is caused to be returned to that same point or position. In other words, even though the bellows were oscillating all the while in consequence of breathing, any particular point in any oscillation in the range wherein the bellows is in a generally collapsed state could be chosen as the point of start and finish of a test provided the patient's breathing was uniform.

However, experience has proven that the breathing of patients during metabolic testing is not always uniform; irregularity frequently is caused through nervousness and sometimes a given patient just naturally breathes unevenly. In any event, if the timing period were to be inaugurated or terminated by mere movement of the bellows in a given direction past a predetermined point in its oscillation in a given range, then the incidence of irregularity of breathing at such time would cause an inaccurate time measurement to be obtained. For example, if the patient sighed deeply just prior to the intended commencement of a test, or just prior to the time the oxygen was about consumed, the additional movement of the bellows caused by the sigh might be enough to start or terminate the test prematurely, with resultant error in the time measurement.

Fluctuations in the breathing of a patient being tested cannot be eliminated, but, in accordance with the present invention, their effect is minimized by deferring admission of oxygen and start and stop of the timing period until the patient, by breathing, has caused the bellows to move past a given point a predetermined number of times. The effect of a single irregular inhalation or exhalation at the start or stop of a test is eliminated by requiring the bellows while oscillating to pass a number of times through a given volumetric state, or has reached a predetermined statistical volume, before the test is started and before the test is stopped.

Figure 11:
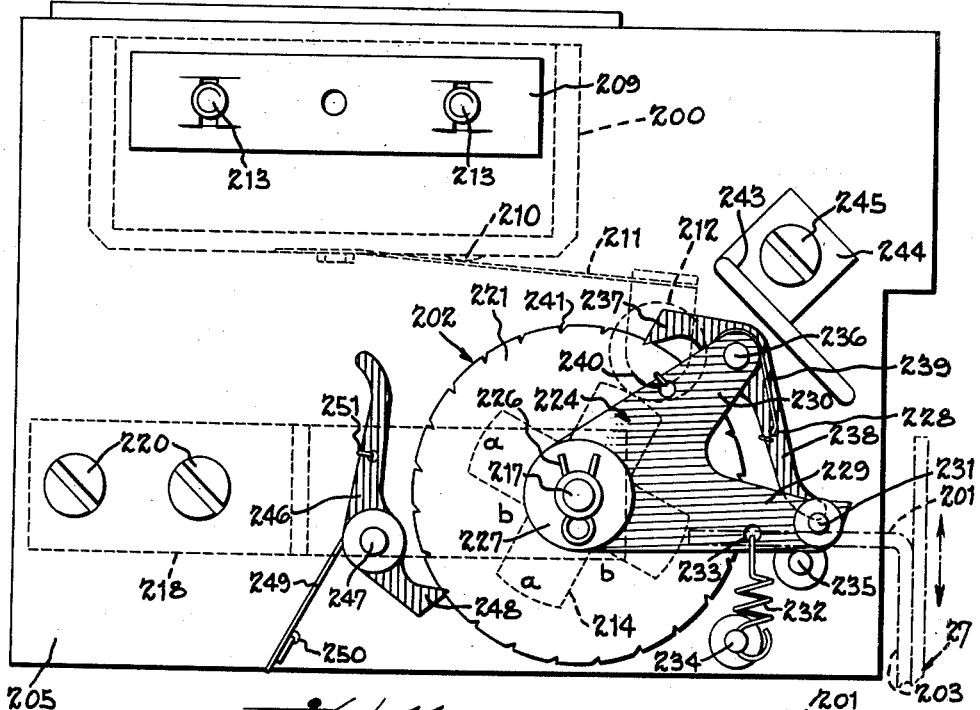
Figure 11 is a plan view of the starting switch control mechanism of the apparatus.
Figure 12:
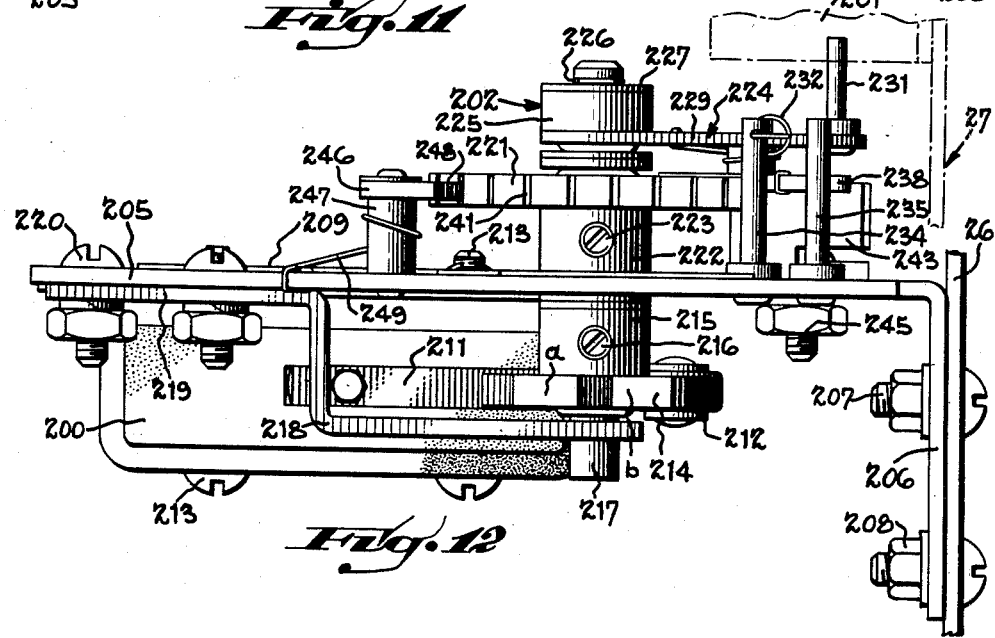
Figure 12 is an enlarged side elevation of the elements shown in Figure 11 in plan view.

One suitable mechanism effective to accomplish this result is shown in the drawings in Figures 3, 11, and 12. In substance, it comprises a timer start-stop switch which is conditionally responsive to bellows movement and a switch control device which defers actuation of the switch at both the start and stop of the test until the bellows has moved past a given point in its range of movement at least several times, preferably three. The start-stop switch is conditioned for actuation by each progressive engagement of the bellows member therewith at the beginning and at the end of the test; hence, a single deep inhalation or exhalation occuring at or near the start or stop time will not cause an otherwise significant time error to be introduced.

The preferred timer start-stop mechanism comprises a timer start-stop switch 200, an actuating finger 201 carried by the bellows, and a counter mechanism indicated generally at 202 through which switch 200 is progressively conditioned for actuation by the finger in response to bellows movement. Actuating finger 201 is mounted on the bellows roller carriage 27 as a portion projecting laterally from a foot 203 fastened to carriage plate 30 by means of a screw 204 which traverses a slot so as to permit the finger position to be adjusted in assembly. Switch 200 is mounted on a horizontal plate 205 of a bracket having a laterally bent leg 206 which is fastened to a face of mounting post 26 by means of screws 207 carrying nuts 208. This switch may be a micro-switch of the single pole, double throw, self-biasing type, and it is fastened to the plate 206 by screws 213 which threadedly engage a strap 209. The actuating button 210 is served by a resilient arm 211 carrying a follower roll 212 at its extremity.

Counter mechanism 202 comprises a cam 214 which is positioned for engagement by follower 212 of the switch arm 211. The cam has spaced circumferential lobes, a, and intervening depressions, b. Hub 215 of the cam is fastened by a set screw 216 upon a vertical shaft 217 which traverses mounting plate 205 and is journaled in it. The lower portion of the shaft 217 is rotatably carried in an outboard bearing bracket 218 having a laterally offset foot 219 fastened to the plate 205 by screws 220.

The portion of shaft 217 projecting above plate 205 carries a ratchet wheel 221 having a hub 222 which is fastened to the shaft by a set screw 223. Above the ratchet wheel, shaft 217 also carries a bellcrank 224 having its hub 225 rotatably journaled on the shaft, the bellcrank being held against axial displacement by a spring cotter 226 which bears against a washer 227.

Bellcrank arm 229 has a post 231 projecting upwardly from it in the path of movement of the finger 201, whereby the bellcrank is swung arcually in counter-clockwise direction when the post 231 is engaged by finger 201 as it moves in a direction toward bellows-collapsed position. This is indicated by the arrow pointing upwardly in Figure 11. The bellcrank is biased for return movement in the opposite direction by a tension spring 232 having one end attached to the bellcrank as at 233 and having is opposite end fastened through a hole in a rigid post 234 projecting upwardly from the plate 205. The rest position of the bellcrank under spring influence is determined by abutment post 235 which also projects upwardly from plate 205 for engagement by an edge arm 229 of the bellcrank.

The bellcrank, at its other arm 230, is equipped with a pivot pin 236 which rotatably carries a pawl 237 having its nose portion engaging the periphery of the ratchet wheel 221. The pawl 237 also carries a trailing arm 238, and a spring 239 biases the nose of the pawl into engagement with the ratchet wheel periphery, one end of spring 239 being fastened to the arm 230 of the bellows, as at 240, while the opposite end of the spring is fastened to the trailing arm 238 of the bellows, as at 228.

The counter mechanism disclosed in the drawings is designed to defer actuation of switch 200 until the bellcrank finger 237 has been engaged three successive times by the bellows finger 201, whether at the start of a test or at the termination thereof. Therefore, ratchet wheel 221 has twenty-four ratchet notches 241, and the cam 214 has four equally spaced lobes, a, and four intervening depressions, b. Lobes a are of such width that the ratchet wheel must be advanced three notches before switch arm 211 will be actuated through engagement of the lobe with the switch arm follower 212. Similarly, the width of the depressions b is such that the ratchet wheel must be advanced through three successive notches thereof before the switch is thrown in the opposite direction. Pawl 237, however, is effective to advance the ratchet wheel a distance from only one notch to the next, thereby limiting the degree which the ratchet wheel is caused to move no matter how far the bellows moves in its oscillation in the pawl-actuating direction. This is accomplished by the provision of a pawl throw-out member 243 which is shown in the form of a plate having a foot portion 244 fastened to support 205 by means of a screw 245. The guide face of throw-out plate 243 is positioned to be engaged by the trailing portion 238 of the pawl as it swings arcually around shaft 217 and thereby to lift the nose end of the pawl from the periphery of the ratchet wheel, but is so positioned that throw-out occurs only after the pawl has rotated the ratchet wheel a distance corresponding to one notch. Therefore, no matter whether the bellows continues to move in the collapse direction a distance corresponding to an advancement of the ratchet wheel by more than one notch, all movement of the bellcrank thereby beyond a distance corresponding to one notch is accompanied by disengagement of the pawl from the periphery thereof. Hence, the counter denotes each cyclic movement of the bellows in the collapsing direction and progressively conditions the switch for actuation on the third successive such movement, no matter what the travel of the bellows might be during each cycle.

To insure unidirectional movement only of the ratchet wheel, and to prevent countermovement which might otherwise arise because of the resiliency of switch arm 211, the counter mechanism includes a lock pawl 246 which is pivotally mounted on a post 247 projecting upwardly from plate 205. The nose 248 of the pawl 246 faces in the same circumferential direction as the nose portion of pawl member 237 and is biased into engagement with the ratchet wheel periphery by a spring 249 having one end connected to the plate 205, as at 250, and the other end connected to a trailing portion of the pawl, as at 251. The pawls are each in engagement with a notch of the ratchet wheel at the same time, and therefore, pawl 248 prevents return of the ratchet should there otherwise be a tendency for it to return while pawl 237 is out of engagement with a ratchet notch.

ACTUAL TIME RATE CONTROL CIRCUIT

The electric circuit through which the elements employed in determining actual metabolic rate are interconnected in the preferred embodiment of this part of the apparatus is shown in the right-hand side of the circuit diagram Figure 20.

The electrical elements such as the motors and switches are adapted to operate upon 120 volt, 60 cycle alternating current which may be supplied through a suitable cord having a connection plug 252 which is preferably grounded for safety. One input lead 253 from the plug is connected to a main single pole, single throw switch 254 located on panel 2, as shown in Figure 2. The other terminal of this switch is connected to a main circuit leg 255 which leads to one terminal of the blower motor 51 through normally open valve-actuated micro-switch 82. The other terminal of plug 252 is connected to the other side of the blower motor 51 through a main circuit leg 256. If desired, a pilot light 257, also mounted on the panelboard 2, may be connected across legs 255, 256 to signal the operator that the main switch 254 is either turned on or off.

The bellows-operated switch 200 is a single pole, double throw switch having its common terminal connected to main leg 255 through a lead 258 and switch 82. One of the other switch terminals, a, is connected through a lead 259 to one terminal of motors 138 and 127 and one terminal of pilot light 260. The pilot light is located on the panelboard 2 and is energized while a test is in progress. Motor 127 of the cartridge-piercing mechanism is connected by lead 261 across leads 256 and 259 in parallel with the pilot light. Lead 261 also includes the terminals of the single pole, single throw piercing cam positioning switch 132. One end of the winding of solenoid 78 is connected to the remaining terminal, b, of the bellows control switch 200, while the opposite end of the solenoid winding is connected through lead 262 to one of the terminals, b, of timer switch 180; an opposite terminal, a, of switch 180 is connected through lead 263 to the lead 261 between the terminals of the piercing motor 127 and the cam positioning switch 132. The common terminal of the timer switch 180 is connected to the main circuit leg 256 through lead 264. Timer motor 138 is connected across leads 256 and 259 in parallel with the piercing motor 127 and pilot light 260.

In Figure 20, the switches are shown in the positions they occupy at the start of a test.

From the construction previously described, it will be seen that valve switch 82 is closed only when valve 6 is closed, that is, only when the valve cap piece 63 is moved toward the valve body to set the closure disks 64 over the open ends of the through-bores 59 and 60 and and thereby place the conduits 4 and 5 respectively in communication with the transverse passageways 61 and 62 which lead to the conduits 11 and 13 of the gas system. Knob 176 of the timer is at zero position with reference to scale 177, and the piercing needle 105 is in its receded position (Figure 15), that is, the drive cam 122 is at its retracted position. It is assumed that the mouth piece has been fixed to the patient, that a filled oxygen capsule has been properly seated and held in its socket, and that valve 6 is open for free communication of the mouth piece conduits 4 and 5 through through-bores 59 and 60.

Switch 254 is now closed. This energizes the pilot light 257, but the main circuit furnished by leg 255 is open at valve switch 82. At the start of any exhalation of breath by the patient, the operator manually pushes cap piece 63 of valve 6 to closed position, thereby directing the patient's breath into the circulating system through the conduits 11 and 13. Closure of the cap piece coincidentally closes valve switch 82, thereby energizing blower motor 51 which induces flow of breath through the mouth piece conduits, the carbon dioxide absorber, and the bellows. When the patient exhales, the pressure in the bellows increases and the bellows expands. Trip arm 201 of the bellows moves in a direction away from the finger of the counter device. When the patient next inhales, the bellows contracts, and, if the bellows contracts far enough (depending upon its original spacing with respect to finger 230), the trip arm engages the bellcrank finger 230 and drives it, but whether this occurs during the first or some successive inhalation by the patient, the ratchet wheel will move only one notch, and switch 200 will not yet be operated. On the third successive inhalation thereafter, however, the ratchet will have moved the ratchet wheel three notches and coincidentally will have advanced a lobe of cam 214 sufficiently to actuate the bellows control switch 200, thereby causing the switch arm to be moved from position b to position a.

A circuit now is completed to the timer motor 138 through leads 259, 255, and the motor starts to run. An energizing circuit to the piercing motor 127 is also now completed through lead 263 which is connected to the main circuit leg 256 through contact a of switch 180 and through lead 264. Therefore, with the commencement of timing, the piercing motor starts to drive piercing cam 122 in a direction effective to elevate the plunger 103 and project the piercing pin 104 through the end of the cartridge, thereby admitting oxygen to the bellows in the measured quantity through the escape conduit. Rotation of the piercing cam in elevating direction of the plunger 99 causes closure of switch 132 which is controlled by the cam, and a holding circuit for continuing the energization of the piercing motor through this cycle is completed through switch 132 and lead 261. Pilot light 260 is also energized at this time, designating that the test is now in progress.

When the timer motor 138 starts to run, lever arm 191 backs away (in counter-clockwise direction, Figure 6) from engagement with the bellcrank arm 186, and the bellcrank, having been released, permits actuating button 185 of the switch 180 to move under its own bias. This corresponds to the throwing of the switch 180 from position a to position b. The action occurs shortly after the timing and piercing motors have been energized, say, in about fifteen seconds or so, and while the piercing cam has made two or three complete revolutions. Therefore, as the arm of switch 180 is moved from position a to position b, the energizing circuit through lead 264 of the piercing motor is opened, but the piercing motor continues to run until the cam has made one revolution and is in a receded position, at which time the cam causes switch 132 controlled thereby to be opened again. Thus, the piercing motor, having performed its function, stops when the plunger 99 is in a receded position, thereby insuring against the inadvertent puncturing of a fresh cartridge which otherwise could occur upon insertion thereof if the piercing cam motor happened to stop when the pin was in an elevated position.

Admission of oxygen from the cartridge expands the bellows, and it continues to oscillate back and forth as the patient breathes, though in a different volumetric range. However, the volume of the bellows progressively is reduced as oxygen is used and as the carbon dioxide formed is absorbed from the circulating gas. Hence, each movement of the free end plate 16 of the bellows in the collapsing direction is a little nearer toward the finger 230 of the counter than the one preceding.

Eventually, the finger 201 on the bellows carriage will engage the counter trip arm and may move it a distance corresponding to one notch of the ratchet wheel, or more or less than one notch. If less, then the ratchet wheel is not advanced, but if the movement of the bellows is sufficient to move the bellcrank a distance equal to or more than one notch, the ratchet wheel will be advanced one notch only because of the throw-out mechanism previously described. In the next two successive inhalations by the patient, the ratchet wheel will be advanced two more notches, and, after advancement of the ratchet wheel through the third successive notch, switch arm of switch 200 will move from its *a* position back to the original position *b* which is occupied at the commencement of the test.

This movement of the switch arm establishes a circuit to the solenoid 78 through contact *b* of switch 180 and lead 264, thereby energizing the solenoid through leads 255 and 256. The armature 77 of the solenoid is thus energized, causing the control shaft 71 of valve 6 to move downwardly. As it does so, the clearance groove 72 becomes aligned with the arms 66, whereupon valve cap piece 63 immediately moves to open position through the action of the compression springs 68. This establishes connection of the conduits 4 and 5 with the atmosphere. Release of the valve cap also opens switch 82 in the main circuit leg 255, thereby de-energizing the piercing and timer motors and the test-on pilot light 260.

The actuation of switch 200 simultaneously opens the circuit to the timer motor 138. The total elapsed time during which all of these events took place subsequent to the initial closure of valve 6 is indicated by the pointer 176 on the scale 177 of the panelboard. This time denotes actual metabolic rate in terms of minutes required for the patient to consume the one measured liter of oxygen which was admitted.

The apparatus is reset for next usage by placing a new cartridge in the socket and by moving pointer 176 to zero position which, through the action of lever arm 190, manually moves the arm of timer switch 180 from the *b* position to the *a* position. This requirement prevents timing error to arise through failure of an operator to reset the timer to zero before commencing a test. If the timer is not set to zero, then as an effort is made to close valve cap 63, valve switch 82 will be closed and the solenoid 78 will be energized to render it impossible to hold the valve cap in switch-closed position.

DETERMINATION OF NORMAL RATE

The actual rate expressed in minutes per liter as provided by operation of the apparatus just described may be compared with normal rate in accordance with conventional mathematical computations if desired. However, to eliminate that need, the present invention also includes means operable conjointly with or independent of the actual rate determining elements for automatically computing normal rate. One suitable type of circuit for computation of an empirical formula such as one or the other of the Harris-Benedict equations (depending on the sex of the patient) is illustrated at the left-hand side of Figure 20.

Power supply

A transformer 266 having its terminals connected across power source leads 255 and 256 has its secondary connected to a rectifier 267 in order that the apparatus may be suitably energized.

Computing circuit

The bridge comprising legs AB, BC, CD, and DA shown in Figure 20 is of the conventional type in circuitry but is seldom, if ever, balanced in use in this environment. The bridge is energized through leads 268 and 269 extending from the rectifier output terminals. Two of the bridge legs, AB and BC, contain balanced, fixed resistances 274, 274 respectively which may be equal to one another according to the arrangement subsequently described. One of the other legs, DA, of the bridge contains a resistance 275 which is furnished by timer-driven potentiometer 159 and a fixed resistance 276. Since it is desired to equate actual rate and normal rate in terms of calories per hour in which the Harris-Benedict formulae express the metabolic rate, the resistance 275 is preferably a tapered or non-linear resistance driven at a uniform rate by the timer motor and calibrated exactly or substantially according to the equation $$\frac{290.4}{t}$$

although, if desired, it may be a linear resistance if the timer motor mechanism is arranged to vary its magnitude according to the same equation.

Leg AD also contains a fixed resistance 276. Since this leg is representative of the time function, the fixed resistance 277 could be omitted if the time of the test were to be infinitely long, but actually, since a test rarely requires over eight minutes, the apparatus has been designed for an eight-minute test maximum and the resistance 276 therefore is proportional to $$\frac{290.4}{8}$$

The remaining leg CD of the Wheatstone bridge contains a fixed resistance 277 and variable resistances 278, 279, and 280. These variable resistances respectively conform functionally to the variable values of age, height, and weight expressed in the Harris-Benedict equations. All of the resistances may be mounted beneath the top panel 2, and the variable resistances 278, 279, and 280 carry respective adjustment knobs 281 which are equipped with pointers served by scales denoting age, weight, and height values. Inasmuch as the Harris-Benedict formulae for males and females are different, each pointer is served by an outside scale to which the pointer is set when the patient is a male, and an inside scale to which the pointer is set when the patient is a female. Since none of the calibrated ranges of age, height, or weight starts at zero, the fixed resistance 277 is proportional to equation constants times the minimum height and weight resistances less the constants times the age resistance.

To determine the relative state of balance of the Wheatstone bridge circuit just described, a meter 282 is provided which may be in the form of a voltmeter or galvanometer. This meter is connected in a leg 283 which also contains fixed loading resistance 284, variable resistance 285, and a single pole, double throw push button type switch 286 which is normally open but which, when closed, connects the meter across bridge terminals B and D. The constructed sensitivity of the meter circuit preferably is great enough so that at all settings of the variable resistances corresponding to age, weight, height, and time, the meter current is only a small percentage of the current in any leg of the bridge. In this manner, the meter itself has little or no effect on the voltage and current distribution in the bridge which might otherwise be important when an unbalanced bridge is used.

CALIBRATION CIRCUIT

Because the Wheatstone bridge just described rarely if ever reaches a balanced condition in the computation of normal metabolic rate, and because, through its state of unbalance, the meter 282 will reflect any variation in voltage impressed upon it from the rectifier as caused by variation in distribution circuit voltage from which the apparatus is operated, it is desirable to calibrate the meter to the point of use or prior to each use to eliminate any error that would otherwise be introduced. For this purpose, in addition to the computing bridge just described, a second alternately operable bridge conveniently is utilized. This second bridge comprises the fixed resistances 274, 275 in legs AB and BC, fixed resistances 287 and 288 which are connected in series with one another across terminals A and C, and a leg 289 which extends from a point intermediate resistances 287 and 288 into connection with meter 282 through switch 286. Thus, resistances 274, 275, 287, and 288 constitute a second bridge upon which the supply voltage may be impressed through terminals A and C, this second bridge being served by meter 282 when the push button switch 286 is in the normally closed position in which it is shown in Figure 20.

To express a final reading as percent BMR, as previously explained, it is desirable that the meter 282 read 100 under full-scale deflection at given supply voltage. Therefore, resistances 287 and 288 are proportioned to provide a degree of unbalance in the bridge equivalent to $+100\%$ BMR, and resistance 285 is then adjusted to make the meter read $+100\%$ BMR when any given voltage from the rectifier is impressed across terminals A and C. When the supply voltage varies, as frequently is the case by as much as five volts or more from one locality to another, variable resistance 285 may be adjusted to compensate for the variation and thereby cause the meter to read 100 under the voltage actually impressed upon the circuit. Knob 290 for adjusting resistance 285 is located at the panel 2.

It will be understood that this calibrating circuit may be omitted if the supply voltage does not vary, or that other expedients for eliminating or compensating for voltage variation may be employed if desired, such as a constant voltage transformer or voltage regulator. The present arrangement is disclosed since it is economical, requiring installation of only two simple resistances and a push button switch. Also, in place of a normally unbalanced computing bridge of the type previously described, it will be understood that a normally balanced type of bridge may be employed wherein line voltage variation is not reflected in the final reading. In such a circuit the meter may be employed to indicate when a balanced condition has been reached, and the final result may be obtained by the setting of a slide wire resistance adjusted to reach the condition of balance.

or the actual rate, may be designated $R_A$, and the variable resistance in leg CD, being proportional to $$2.8 + .26W + .53H - .28A$$

(for male testing) or $27 + .18W + .196H - .193A$ (for female testing), may be designated $R_N$. The following relations then hold:

$$E_A = \frac{R_A}{R_A + R_N} E_N = \frac{R_N}{R_A + R_N} E_A + E_N = E$$

The ratio of voltage is then:

$$\frac{E_A}{E_N} = \frac{\frac{R_A}{R_A + R_N}}{\frac{R_N}{R_A + R_N}} = \frac{R_A}{R_N}$$

The meter is preferably calibrated to read from $-50\%$ to $+100\%$. At those extremes $R_A$ is equal to $\frac{1}{2}R_N$ and $2R_N$ respectively. The same relationship will be true of the voltages $E_A$ and $E_N$.

Then, since $$E = E_A + E_N$$

and at $$+100 \quad E_A = 2E_N$$
$$E_A + \frac{1}{2}E_A = E$$

or $$E_A = \frac{2}{3}E$$

Also at $$-50 \quad E_A + 2E_A = E$$
$$E_A = \frac{1}{3}E$$

Since one side of the meter is connected to a point at voltage $\frac{1}{2}E$ and the other side varies from $\frac{1}{3}E$ to $\frac{2}{3}E$, the meter voltage varies from $-\frac{1}{6}E$ to $+\frac{1}{6}E$. The actual value is dependent only on the ratio of the resistances and not on their numerical values or magnitudes. This, of course, is only true when the meter current is negligible in relation to the currents in the bridge legs.

One specific circuit embodiment of this invention is illustrated by the following table which shows the magnitudes of resistances employed.

| Res. No | 274 | 275 | 276 | 277 | 278 | 279 | 280 | 284 | 285 | 287 | 288 |
|---|---|---|---|---|---|---|---|---|---|---|---|
| Res. in Ohms | 100 | (*) | 75 | 11 | 50 | 50 | 200 | 1,500 | 1,000 | 200 | 100 |

*The potentiometer 275 has a resistance of 221 ohms when the timer knob is set at two minutes and decreases according to equation as described.

OPERATION OF COMPUTING BRIDGE

In the Wheatstone bridge ABCD resistances 274, 274 are equal, the variable resistance corresponds to $$\frac{290.4}{t}$$

and the variable resistances in the fourth leg have a total magnitude equal to a sum proportional to the age, height, and weight values to which the operator has set the pointers on the corresponding scales. Since the third leg resistance $$\frac{290.4}{t}$$

is varied automatically by the timer during test, the net balance or unbalance of the bridge at the end of the test is a value proportional to the ratio between actual and normal oxygen consumption rates.

Intra-circuit comparison of actual and normal metabolic rates in the arrangement disclosed is illustrated as follows: Assume that the push button 286 is depressed so as to place the meter 282 in circuit connection across terminals B and D and that a given voltage E is applied across points A and C of the bridge. The voltage at point B thus will always be $\frac{1}{2}E$ since resistances 274, 274 are equal. The variable resistance in leg AD, being proportional to the quantity $$\frac{290.4}{t}$$

From this description, therefore, it will be seen that prior to test it is only necessary for the operator to set the age, height, and weight resistances according to the given patient's characteristics by adjustment of the respective knobs at the panel 2, and, if necessary, set the meter for full-scale deflection by adjustment of resistance 285 to compensate for line voltage variation. At completion of the test, it is only necessary for the operator to depress the push button switch 286 and read the percent BMR applicable to that patient. On the other hand, if it is desired to use the computing circuit separately from the actual rate-determination apparatus, then it is only necessary to set the timer knob according to the time found by separate testing to be required for the patient to consume a liter of oxygen, then operate the push button to obtain percent BMR reading applicable to that patient.

Operation of the equipment is independent of atmospheric temperature and pressure variations, while actual time may be determined automatically with the present apparatus within a degree of accuracy far better than can be obtained in the usual procedure. Since the determination of actual metabolic rate is accomplished by the use of a tared weight of oxygen representing one liter under standard pressure and temperature conditions in the chosen embodiment, the range of movement of the bellows from maximum to minimum or from start to stop of the test, as determined by local atmospheric pressure, has no bearing upon the accuracy of the test, and the apparatus provides accurate results whether used at sea level or at high altitudes. Normal metabolic rate is determined automatically, without resort to slide rules, charts, or computations, and the final reading of the ratio between actual and normal metabolic rates is expressed merely by pushing the button on the panelboard, thereby eliminating error possibilities.

From the foregoing description of the principles of the invention and the detailed description of a preferred embodiment, those skilled in the art readily will comprehend the variations and alternatives of design to which the invention is susceptible. Accordingly, it is desired to be limited only by the claims which follow.

Having described my invention, I claim:

1. Basal metabolism apparatus, comprising a gas system including an expansible and contractible chamber and means for interconnecting the gas system with the respiratory system of a patient to be tested, whereby the patient may inhale from and exhale into the said gas system, the said gas system also having means for absorbing from the gas therein the carbon dioxide which is breathed into the same by the patient undergoing a test, means operable in conjunction with said gas system for determining the actual time in which a patient consumes a given quantity of oxygen from said system, said means comprising, a timer initially responsive to the expansible chamber when it is in a certain volumetric state, means automatically operable in response to initial actuation of the timer for delivering a predetermined quantity of oxygen into the said gas system, and means for decommissioning the timer when the said expansible chamber regains the volumetric state it occupied when the timer initially responded, whereby the ratio between the volume of oxygen delivered to the system and the time elapsed in the period between initial actuation and decommissioning of the timer represents the actual rate at which a patient being tested consumes oxygen from the system.

2. In a basal metabolism measuring apparatus having a gas system into and from which a patient is adapted to breathe, the said gas system including a variable volume chamber having a member movable in response to the patient's inhalations and exhalations, a timer, and means for actuating said timer, comprising a trip engageable by said movable member each time the said movable member reaches a certain point in its range of movement and a ratcheted counter for deferring timer actuation until the said trip has been engaged at least a predetermined number of times by the said movable member.

3. Basal metabolism apparatus, comprising an expansible and contractible chamber, a member movable in response to changes in the volumetric state of said chamber, conduit means communicating with said chamber through which a patient may breathe, thereby effecting oscillation of the said movable member in consequence of the patient's inhalations and exhalations, an absorber communicating with the said chamber for removing carbon dioxide from the gas therein, a switch responsive to the movement of said movable member in its passage through a given range of movement, means including an electrical circuit controlled by said switch for admitting oxygen to said chamber thereby effecting a displacement of the range in which its movable member oscillates, and electric timer means, including an electric circuit controlled by said switch, for measuring the time required to remove from said chamber, by the breathing of a patient through said conduit means, the oxygen delivered to said chamber by said oxygen-admitting means.

4. In a basal metabolism apparatus having an expansible and contractible bellows, means for delivering oxygen thereto, comprising a holder adapted to support a rupturable cartridge containing compressed oxygen, conduit means extending from said holder to said bellows for delivering thereto oxygen released from said cartridge upon puncturing of the same, a puncturing member normally spaced from a cartridge in said holder but engageable therewith to puncture the same for releasing the oxygen therefrom to said conduit, a movable driver for effecting cartridge-puncturing engagement of said puncturing member and a cartridge in said holder, and means responsive to the movement of the bellows when it is in a certain predetermined volumetric state for effecting actuation of said driver.

5. In a basal metabolism apparatus having a bellows, a holder adapted to support a rupturable cartridge containing compressed oxygen, conduit means extending from said holder to said bellows for delivering oxygen released from said cartridge upon puncturing of the same, a movable member normally spaced from a cartridge in said holder but engageable therewith to puncture the same for releasing the oxygen therefrom to said conduit, a driver for actuating said puncturing member, an energizing circuit including a switch responsive to the movement of the bellows when it is in a certain volumetric state, a motor controlled by said switch, and means driven by said motor for actuating said driver.

6. In a basal metabolism apparatus having a bellows, a holder adapted to support a rupturable cartridge containing compressed oxygen, conduit means extending from said holder to said bellows for delivering to said bellows oxygen released from said cartridge upon puncturing of the same, a puncturing member normally spaced from a cartridge in said holder but engageable therewith to puncture the same for releasing the oxygen therefrom to said conduit, a driver for said puncturing member, means responsive to the movement of the bellows when it is in a certain predetermined volumetric state for effecting actuation of said driver, and means for returning said puncturing member to a position spaced from a cartridge in said holder following puncturing actuation thereof.

7. In a basal metabolism apparatus having a bellows, a holder adapted to support a rupturable cartridge containing compressed oxygen, conduit means extending from said holder to said bellows for delivering to said bellows the oxygen released from said cartridge upon puncturing of the same, a puncturing member normally spaced from a cartridge in said holder but engageable therewith to puncture the same for releasing the oxygen therefrom to said conduit, a driver for said puncturing member, an energizing circuit including a switch responsive to the movement of the bellows when it is in a predetermined volumetric state, a motor in said energizing circuit and controlled by said switch, motion-transmitting means driven by said motor for operating said puncturing member, and supplemental switch means effective to denergize said motor after said motion-transmitting means has been driven thereby to advance said puncturing member through at least one operational cycle, whereby said puncturing member rests in spaced relation to a cartridge in said holder after the cartridge has been punctured.

8. Basal metabolism apparatus, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a Wheatstone bridge having in one of its legs variable resistances functionally corresponding to variable factors of an empirical equation expressing normal metabolic rate in terms of age and body area characteristics, a variable resistance in another of its legs functionally corresponding to actual metabolic rate, means coupled to said motor for varying said variable resistance, a meter connected across the resistances, and means for impressing a voltage upon the bridge whereby the meter, responding to the relative state of balance of the bridge in conformity with the magnitude of the resistance values to which the variable resistances in the respective legs have been set and driven, indicates a value functionally corresponding to the ratio between actual and normal metabolic rates.

9. Basal metabolism apparatus, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a normally unbalanced Wheatstone bridge having balanced resistances in two of its legs, variable resistances in a third leg functionally conforming to the variable factors of an empirical equation expressing normal metabolic rate as calories per unit of time in terms of age and body area characteristics of a given patient, a variable resistance in its fourth leg, said variable resistance being coupled to said motor for variation thereby and functionally conforming to actual metabolic rate, expressed as calories per unit of time, means for applying a fixed voltage upon two opposed terminals of said bridge, and a meter connected across the other two opposed terminals of said bridge whereby the said meter is effective to compare the relative magnitudes to which the respective variable resistances have been set and driven, and thereby provide a comparison between actual and normal metabolic rates applicable to the given patient.

10. Basal metabolism apparatus, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a normally unbalanced Wheatstone bridge having balanced resistances in two adjacent of its legs, variable resistances in a third leg conforming to the variable factors of an empirical equation expressing normal metabolic rate in terms of age and body area characteristics of a given patient, a variable resistance in a fourth leg functionally conforming to actual metabolic rate in terms of oxygen consumption per unit of time as determined by the testing of a patient, means for applying a voltage upon two opposed terminals of said bridge, manual means for setting the variable resistances in the third leg, said motor being coupled to said variable resistance in the fourth leg whereby the connected resistance in the fourth leg is varied in proportion to the rate at which a patient being tested consumes oxygen, and a meter connected in said Wheatstone bridge for measuring the relative state of balance thereof whereby the said meter is effective to compare the relative magnitudes to which the third leg variable resistances have been set manually and the magnitude to which the fourth leg resistance has been driven and thereby provide a comparison between actual and normal metabolic rates applicable to the given patient.

11. Basal metabolism apparatus, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a Wheatstone bridge having variable resistances in one of its legs functionally corresponding to variable factors of an empirical equation expressing normal metabolic rate as calories per hour in terms of age and body area characteristics of a given patient, a tapered variable resistance in another of its legs functionally corresponding to the equation $$\frac{290.4}{t}$$

where $t$ is the time in minutes required by the given patient to consume one liter of oxygen, thereby connoting actual metabolic rate of that patient, means for driving said tapered resistance by said motor to vary the same, the said Wheatstone bridge being in a certain relative state of balance when the said variable resistances have been set initially to predetermined values, means for applying a voltage upon said bridge, and an indicator device connected in said bridge to measure the relative magnitudes to which the variable resistances subsequently have been set and varied respectively and thereby indicate the ratio between actual and normal metabolic rates applicable to the given patient.

12. Basal metabolism apparatus, comprising a conduited gas system into and from which a patient exhales and inhales, means for circulating the breath gas in said system, means for admitting a predetermined quantity of oxygen into said system, means for removing carbon dioxide from the circulating breath gas, a motor, means for causing the motor to operate throughout the period of time required by a patient to consume a predetermined quantity of oxygen from said system by breathing into and from the same, a potentiometer driven by said motor, a Wheatstone bridge circuit including said potentiometer in one of its legs and having manually adjustable resistances included in another of its legs which may be set to correspond functionally to the variable factors of an empirical equation expressing normal metabolic rate, a meter connected in said Wheatstone bridge circuit across said motor-driven potentiometer and adjustable resistances, and means for impressing a voltage upon said Wheatstone bridge circuit whereby the meter provides a direct reading comparison between the actual metabolic rate as determined by the depletion of oxygen from the gas in said gas system and the normal metabolic rate as determined by the manual setting of the adjustable resistances.

13. A basal metabolism computer, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a Wheatstone bridge having resistances serially connected in one of its legs, the resistances being manually variable in respective ranges of magnitude corresponding functionally to the variables expressed in a Harris-Benedict empirical equation expressing normal metabolic rate, a variable resistance in another of its legs driven by said motor and calibrated substantially according to the non-linear equation $$\frac{290.4}{t}$$

where $t$ is the time in minutes required for a given patient to consume one liter of oxygen, means for impressing a voltage upon said Wheatstone bridge, and indicating device connected in said Wheatstone bridge circuit for measuring the relative state of balance of the resistances in the respective legs of Wheatstone bridge circuit.

14. A basal metabolism computer, comprising a conduited gas system into and from which a patient inhales and exhales, means for circulating the breath gas in said system, means for admitting a predetermined quantity of oxygen into said system, means to removing carbon dioxide from the circulating breath gas, a motor, means for causing said motor to operate throughout the period of time required by a patient to consume a predetermined quantity of oxygen from said system by breathing into and from the same, a normally unbalanced Wheatstone bridge having balanced resistances in two adjacent legs, manually variable resistances in a third leg having respective ranges of magnitude corresponding functionally to the variable factors of a Harris-Benedict empirical equation expressing normal metabolic rate, a resistance in the fourth of its legs driven by said motor and calibrated in magnitude substantially according to the equation $$\frac{290.4}{t}$$

where $t$ is the time in minutes required for a given patient to consume one liter of oxygen, whereby the said fourth leg resistance is varied by said motor according to the actual time required by a given patient to consume one liter of oxygen by breathing, means for impressing a fixed voltage upon said Wheatstone bridge, and a meter connected in said Wheatstone bridge circuit to measure the relative state of balance of the Wheatstone bridge circuit in respect to the magnitudes to which the respective third and fourth leg resistances have been set.

15. Basal metabolism apparatus, including an expansible and contractible bellows, a member movable in response to bellows expansion and contraction, conduit means into and from which a patient may breathe into and from said bellows, thereby effecting oscillation of the movable member in accordance with the patient's inhalations and exhalations, an absorber communicating with the bellows for removing carbon dioxide from the gas therein, means responsive to the oscillations of the movable member of the bellows when the statistical volume of the bellows is low for delivering a predetermined charge of oxygen into the bellows whereby the statistical volume of the bellows is increased, and timer means for automatically measuring the length of time required for the patient to contract the bellows to the same statistical volume it occupied when the oxygen was delivered, by depletion of the oxygen charge in consequence of breathing through said conduit means.

16. Basal metabolism apparatus, comprising an expansible and contractible chamber, a member movable in response to changes in the volumetric state of said chamber, conduit means connected to said chamber into and from which a patient may breathe thereby effecting oscillation of the movable member in accordance with the patient's inhalations and exhalations, an absorber communicating with said chamber for removing carbon dioxide from the gas therein, means biasing the expansible chamber toward a collapsed state, a control device responsive to the oscillations of the movable member of said chamber when its average volumetric status is low, means controlled by said control device upon actuation of the same for delivering a predetermined quantity of oxygen into the said chamber, in consequence of which the average volumetric status of the chamber is increased, and a timer governed by said control device for automatically measuring the time elapsing between initial actuation of the control device and a successive actuation thereof in consequence of depletion of the delivered oxygen supply as caused by the patient's breathing into and from said chamber through said conduit means.

17. Basal metabolism apparatus, comprising a gas system including an expansible chamber, conduit means having at one end a face mask into and from which a patient may breathe and communicating with said chamber at its other end, a valve in said conduit means effective to maintain communication of the face mask with said chamber, but operable to a second position in which said face mask is placed in communication with the atmosphere, an actuator for said valve, means for admitting a predetermined quantity of oxygen to said chamber, timing means for measuring the period of time required by a patient, through breathing into and from said face mask, conduit means and chamber, to consume the said measured quantity of oxygen delivered thereto, and means controlled by said timer device for operating said valve actuator to position said valve in said second position at the end of the measured timed period.

18. Basal metabolism apparatus, comprising a gas system including an expansible chamber, conduit means communicating with said chamber into and from which a patient may breathe, means for delivering a predetermined quantity of oxygen of given quality to said chamber, timing means for measuring the time required by the patient, breathing into and from said conduit means and chamber, to consume the said measured quantity of oxygen delivered thereto, the said timer having a pointer which is manually adjustable to a starting position, and an interlock controlled by said timer for rendering said apparatus inoperable until said timer pointer is set at starting position prior to inauguration of a test.

19. In a basal metabolism apparatus having a bellows, means biasing the bellows toward collapsed state, conduit means communicating with the bellows into and from which a patient is adapted to breathe, thereby effecting oscillation of the bellows, means movable in accordance with changes in the volumetric state of the bellows, a counter having a trip arm responsive to movement of said movable means in bellows-collapsing direction, and a control switch, the said counter having means associated therewith effective to actuate the control switch only after the trip arm of the counter has been actuated a predetermined number of times by the said movable means, whereby the counter is effective to prevent the actuation of the control switch in consequence of incidental but abnormal inhalation or exhalation of the patient into the conduit means.

20. Basal metabolism apparatus, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a Wheatstone bridge having a resistance in one of its legs variably conformable to the actual metabolic rate of a given patient, means for driving said variable resistance by said motor resistances in a second of its legs respectively variably conformable to age, weight, and height factors of an empirical equation expressing normal metabolic rate in terms of age, weight, and height, means for adjusting said second leg resistance manually, means for impressing a voltage across opposed terminals of said Wheatstone bridge which includes all of the said resistances, a meter connected in said Wheatstone bridge circuit to measure the ratio between the resistances in the respective first and second legs, and means in circuit connection with said meter and voltage source for rendering the meter reading independent of variations in the magnitude of the applied voltage.

21. Basal metabolism apparatus, comprising a conduited gas system into and from which a patient inhales and exhales, means for circulating the breath gas in said system, means for admitting a predetermined quantity of oxygen into said system, means for removing carbon dioxide from the circulating breath gas, a motor, means for causing said motor to operate throughout the period of time required by a patient to consume a predetermined quantity of oxygen from said system by breathing into and from the same, a normally unbalanced Wheatstone bridge having resistances in one of its legs variably conforming to age, weight, and height factors of an empirical equation expressing normal metabolic rate in terms of age, weight, and height, the said Wheatstone bridge having a resistance in a second leg thereof which is variably conformable to the actual metabolic rate of a given patient, said motor being coupled to said resistance to vary the same progressively, the two remaining legs of said Wheatstone bridge respectively having resistances which are balanced with respect to one another, means for applying a voltage across terminals of said bridge which include the said first and second legs, a meter connected across the other two terminals of said bridge whereby the meter reads the ratio between the resistances in the first and second legs and thereby designates the ratio between actual and normal metabolic rates according to the voltage applied to the bridge, and means for calibrating the meter to compensate for variations in the applied voltage from a predetermined voltage.

22. In a basal metabolism apparatus having an expansible and contractible bellows including a member movable in response to changes in the bellows volumetric state, conduit means connected to said bellows through which a patient may breathe, thereby effecting oscillation of the said movable member in consequence of the patient's inhalations and exhalations, a ratchet wheel having a plurality of notches in its periphery, a pawl engageable with said notches and positioned for engagement by the said movable member upon movement thereof past a given point in its range of oscillation whereby the pawl is effective to rotate the ratchet wheel, a throw-out device for effecting disengagement of the pawl from the ratchet wheel after the pawl has moved the ratchet wheel through a given arc of rotation, and a switch responsive to controlled movement of said ratchet wheel through an arc which is an integer multiple of the said arc of rotation.

References Cited in the file of this patent

UNITED STATES PATENTS

| | | |
|---|---|---|
| 1,826,762 | Franklin | Oct. 13, 1931 |
| 2,537,498 | Wickesser | Jan. 9, 1951 |
| 2,704,540 | Engelder | Mar. 22, 1955 |
| 2,707,947 | Traugott | May 10, 1955 |
| 2,792,828 | Engelder | May 21, 1957 |